(12) United States Patent
Roberts et al.

(10) Patent No.: US 11,714,931 B2
(45) Date of Patent: Aug. 1, 2023

(54) METHODS AND SYSTEMS FOR GENERATIVELY DESIGNING ASSEMBLIES OF MECHANICAL PARTS

(71) Applicant: Desktop Metal, Inc., Burlington, MA (US)

(72) Inventors: Andrew Fiske Roberts, Chelsea, MA (US); Ricardo Chin, Shrewsbury, MA (US)

(73) Assignee: Desktop Metal, Inc., Burlington, MA (US)

( * ) Notice: Subject to any disclaimer, the term of this patent is extended or adjusted under 35 U.S.C. 154(b) by 369 days.

(21) Appl. No.: 16/887,834

(22) Filed: May 29, 2020

(65) Prior Publication Data
US 2021/0374302 A1 Dec. 2, 2021

(51) Int. Cl.
*G06F 30/17* (2020.01)
*H04L 67/10* (2022.01)

(52) U.S. Cl.
CPC .............. *G06F 30/17* (2020.01); *H04L 67/10* (2013.01)

(58) Field of Classification Search
CPC ...... G06F 30/17; G06F 30/00; G06F 2111/20; H04L 67/10
USPC .......................................................... 703/7, 6
See application file for complete search history.

(56) References Cited

U.S. PATENT DOCUMENTS

| 7,499,845 | B1 * | 3/2009 | Quincy | G06F 30/23 703/7 |
| 2008/0221841 | A1 * | 9/2008 | Uchikura | G06F 30/17 703/2 |
| 2017/0220730 | A1 * | 8/2017 | Marini | G06T 17/00 |
| 2018/0001564 | A1 * | 1/2018 | Kroner | B29C 64/118 |

FOREIGN PATENT DOCUMENTS

WO   WO-2018017626 A2 *   1/2018 ............. G06F 30/00

* cited by examiner

*Primary Examiner* — Cedric Johnson
(74) *Attorney, Agent, or Firm* — Jonathan D. Hall; Oak Law, PLLC

(57) ABSTRACT

Methods and systems are disclosed for generatively designing a model of an assembly of mechanical parts. One method includes receiving a first set of constraints for a first part; determining a spatial relationship between the first part and a second part; updating the first set of constraints for the first part based on at least the spatial relationship between the first part and the second part; updating a second set of constraints for the second part based on at least the updated first set up constraints and/or the spatial relationship between the first part and the second part; and generating a model for the first part based on the updated first set of constraints.

17 Claims, 14 Drawing Sheets

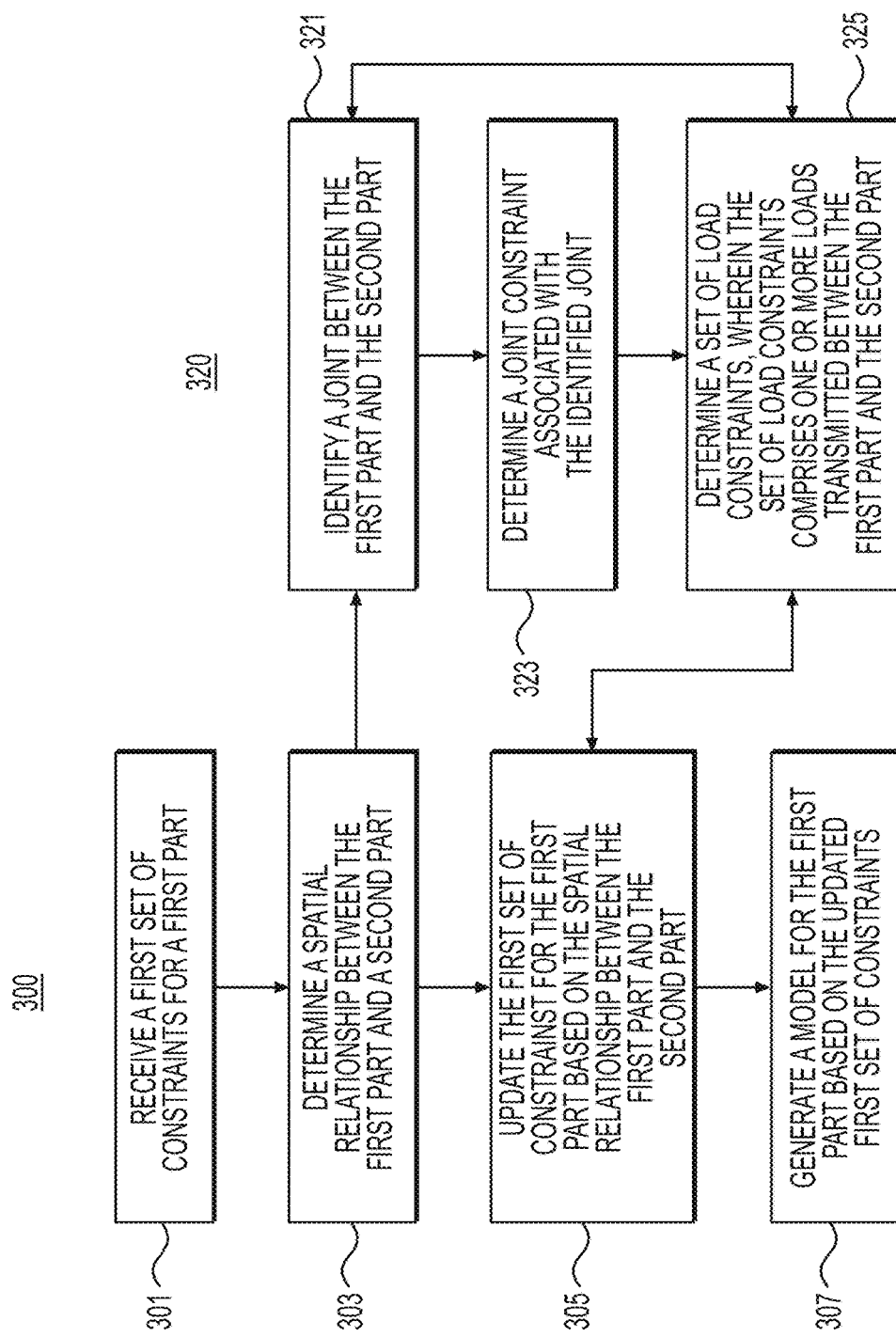

METHODS AND SYSTEMS FOR GENERATIVELY DESIGNING ASSEMBLIES OF MECHANICAL PARTS

FIELD

Various embodiments of the present invention relate generally to automated design and, more particularly, to enabling generative design of entire assemblies of mechanical parts.

INTRODUCTION

Current computer-aided generative design tools are part-centric, meaning a user must design each mechanical part individually, and then fit the constructed mechanical parts together in an assembly. Since each part is created independently, the parts may interfere or collide with one another when joined in an assembly. Further, if modifications are made to one part, other interacting parts may also need to be separately altered. Several iterations of alterations may be required to make sure that changes to one part are compatible to changes to one or more other parts of an assembly.

As a result, users currently must manually ensure that generated parts do not have incompatible interferences when assembled. For example, users may design a first part via a generative design simulation, then manually input the results of the design simulation of the first part to set up generative design constraints for the second part. For instance, a user wanting to create two mated parts (e.g., "Part A" and "Part B") and to ensure that the Part A would not have incompatible interferences with Part B, may (1) generate Part A via generative design techniques, (2) manually input specifications of generated Part A into the setup constraints for generatively designing Part B, (3) generatively design Part B, and (4) iteratively repeat steps (1)-(3) using different constraints for Part A and Part B until optimization is reached for the assembly of Part A and Part B. This manual process may be iterative, time-consuming, and error-prone.

There is thus a need for systems and methods configured to generatively design multiple parts of an assembly at once so that changes to the design of a given part of the assembly are accounted for automatically in the design of another part. The present invention is directed at addressing one or more of the challenges of described above.

SUMMARY

Examples of the present invention relate to, among other things, systems and methods for generating components of assemblies using generative design. Each of the examples disclosed herein may include one or more of the features described in connection with any of the other disclosed examples.

According to certain aspects of the present invention, systems and methods are disclosed for generatively designing a model of an assembly of mechanical parts. One embodiment provides a computer-implemented method for generatively designing a model of an assembly of mechanical parts, comprising: receiving a first set of constraints for a first part; determining a spatial relationship between the first part and a second part; updating the first set of constraints for the first part based on at least the spatial relationship between the first part and the second part; and generating a model for the first part based on the updated first set of constraints.

One embodiment provides a non-transitory computer readable medium for generatively designing a model of an assembly of mechanical parts. The non-transitory computer readable medium may store instructions which, when executed by one or more processors, cause the one or more processors to perform a method comprising: receiving a first set of constraints for a first part; determining a spatial relationship between the first part and a second part; updating the first set of constraints for the first part based on at least the spatial relationship between the first part and the second part; and generating a model for the first part based on the updated first set of constraints.

One embodiment provides a system for generatively designing a model of an assembly of mechanical parts. The system may comprise a data storage device storing instructions for performing a method of generating the model of the assembly of mechanical parts; and a processor configured to execute the instructions to perform a method including: receiving a first set of constraints for a first part; determining a spatial relationship between the first part and a second part; updating the first set of constraints for the first part based on at least the spatial relationship between the first part and the second part; and generating a model for the first part based on the updated first set of constraints. The method may further include updating a second set of constraints for the second part based on at least the updated first set of constraints and/or the spatial relationship between the first part and the second part. Accordingly, linkage interference between the first and second parts may be avoided.

It is to be understood that both the foregoing general description and the following detailed description are exemplary and explanatory only and are not restrictive of the disclosed embodiments, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The terms "object," "part," and "component," as used herein, are intended to encompass any object fabricated through the generative design techniques described herein.

It should be noted that all numeric values disclosed or claimed herein (including all disclosed values, limits, and ranges) may have a variation of +/−10% (unless a different variation is specified) from the disclosed numeric value. In this invention, unless stated otherwise, relative terms, such as, for example, "about," "substantially," and "approximately" are used to indicate a possible variation of +/−10% in the stated value. Moreover, in the claims, values, limits, and/or ranges of various claimed elements and/or features means the stated value, limit, and/or range +/−10%.

The following description may refer to "a first part" and "a second part." The "first part" and the "second part" may refer to any parts in an assembly. The disclosed embodiments may also apply to assemblies comprising any number of parts (e.g., three, four, or more parts).

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this invention.

FIGS. 3A, 3B, 3C, and 4 are flowcharts of exemplary methods of generatively designing mechanical parts of an assembly, according to aspects of the present invention.

DETAILED DESCRIPTION OF EMBODIMENTS

Figure 1:
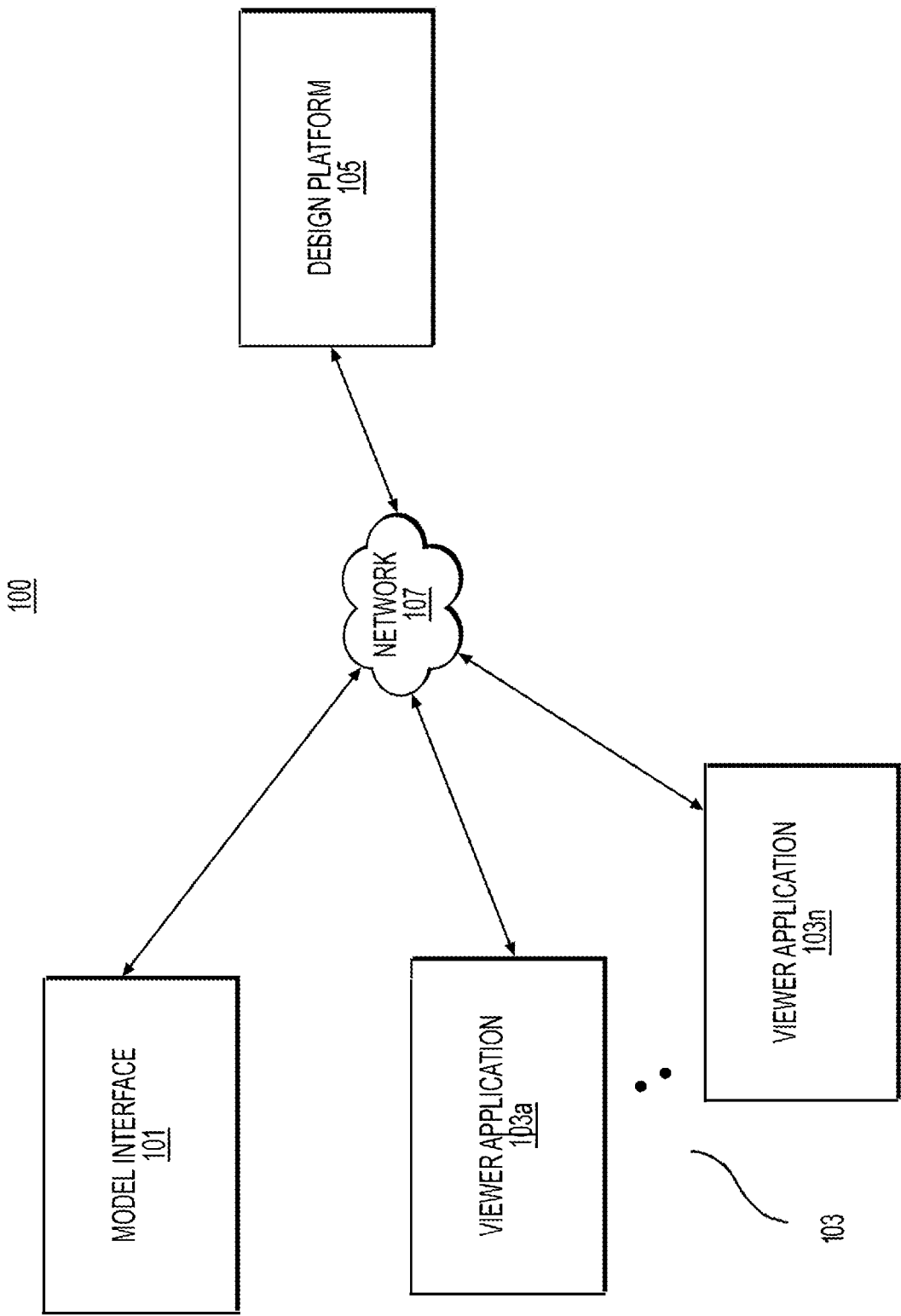
FIG. 1 depicts a block diagram of an exemplary generative design system for assemblies, according to one aspect of the present invention.

Various embodiments of the present invention relate generally to generating assemblies of mechanical parts and, more particularly, to enabling simultaneous, generatively designed construction of assemblies of mechanical parts.

The subject matter of the present invention will now be described more fully with reference to the accompanying drawings that show, by way of illustration, specific exemplary embodiments.

The disclosed exemplary embodiments are merely illustrative. The described subject matter may be embodied as methods, devices, components, or systems. Present embodiments may, for example, take the form of hardware, software, firmware or any combination thereof (other than software per se).

In current generative design tools, the design of one part in an assembly is not considered in the design of another part in an assembly. Users model and design each mechanical part individually, and fit the parts together later in an assembly. A user using current design tools must design parts sequentially, one by one. This may entail manually using the results of a design simulation of a first mechanical part to set up the design constraints of a simulation for a second mechanical part. As an example, in order to model two mated parts and ensure that the geometries of the two parts do not interfere or overlap, a user must set up a generative design simulation for a first part, generate the first part via the simulation, and then manually assemble the finished first part with the initial setup of the generative design simulation for the second part of the mated parts. Given the manual nature of this process, a user would have to repeat iterations of these steps, using different design constraints for each of the two parts. Several iterations may be needed in order for a user to complete a design of an assembly of the two parts.

This sequential, manual process is not only time-consuming and tedious, it is inexact and error-prone. In sequentially developing parts of an assembly, a user manually copies geometry from a first completed part, and then either manually subtracts the first part's geometry from a design space/volume permitted for the second part, or manually defines the first part's geometry as a keep-out region for the second part. These manual steps create possible error, both in accurately defining the first part and in designing the second part.

The present embodiments improve current tools by negating the current sequential, manual process. The embodiments described herein allow users to design multiple parts that fit together in the context of an assembly. For example, the present embodiments allow the simultaneous generation of two mating mechanical parts. The present embodiments further generate mating mechanical parts such that the part geometries do not intersect or interfere with one another. In the present embodiments, changes to geometries of one part may trigger automatic updates to constraints that affect the geometries of other parts in an assembly.

Further, the present embodiments provide generated assemblies that satisfy assembly-level constraints. For example, mated mechanical parts developed by the present embodiments may each have minimal masses, given a set of loads on their assembly. The disclosed embodiments thus improve current tools by providing a three-dimensional (3D) simulation environment that allows for multiple parts of an assembly to be generated simultaneously, with considerations of assembly-level geometries and constraints.

FIG. 1 depicts an exemplary generative design system 100 for forming an assembly. The generative design system 100 may include a model interface 101, one or more viewer applications 103a-103n (collectively "viewer application(s) 103"), and a design platform 105. Model interface 101 and viewer application(s) 103 may be various ways to access the modeling capabilities of design platform 105. Model interface 101 may be comprised of a solid modeling or computer-aided engineering processor, e.g., CAD, that may be used to provide inputs (e.g., starting point or target location) to design platform 105. Model interface 101 may support design platform 105 as a software plug-in available on model interface 101. For example, model interface 101 may provide modeling functionalities of design platform 105 as one of multiple modeling options (e.g., solid modeling, surface modeling, wireframe modeling, etc.). In some embodiments, the model interface 101 may present a user interface where a user may input information about parts to be formed. In some cases, the user interface or prompts in the user interface may be provided by design platform 105. Viewer application(s) 103 may be interfaces that provide remote access to design platform 105.

Model interface 101 may provide access to design platform 105 analyses on a local computing device, whereas viewer application(s) 103 may access design platform 105 analyses that are performed at computing device(s) or cloud computing platforms remote from and independent of the viewer application(s). Some embodiments may include multiple model interfaces 101, e.g., where each model interface 101 may provide access to design platform 105 or may include design platform 105 as a plug-in to the model interface 101. Model interface 101, viewer application(s) 103, and/or the design platform 105 may include one or more of processors (e.g., central processing units), computers, laptops, computing devices, computing platforms (e.g., cloud computing platforms), mobile devices, mobile phones, tablets, etc.

The design platform 105 may include one or more computing devices or services (e.g., cloud computing platforms). The design platform 105 may create generatively-designed structures for assemblies of mechanical parts. For example, design platform 105 may employ any known generative design technique, including topology optimization, to create a model of the structure of a final part or assembly of parts. In a scenario where topology optimization is used, element densities may be updated until a geometric structure (or assembly of geometric structures) meets an objective based on a combination of material properties and boundary conditions (e.g., loads and fixed regions).

Rather than generate each mechanical part in isolation (as is the current methodology), design platform 105 may link multiple independent computing tasks, each computing task being for an individual mechanical part. These computing tasks may comprise design simulations which run in parallel on different computing nodes (e.g., FIG. 5F). Each simulation task may pass event and state change information to other simulation tasks, so that geometry changes of a single part may inform development of another part in the assembly.

In other words, design platform 105 may generate multiple part geometries simultaneously by continually propagating geometric changes of a part to design environments of other parts in an assembly. The propagation of the geometric changes may ensure that interferences or overlaps do not develop between parts. The design platform 105 may also simulate parts operating as part of a load chain, where parts may transmit forces through joint constraints to other parts. This is an improvement on current, part-centric generative design systems, which only define constraints on each part in isolation. For example, design platform 105 may capture and transmit the geometry of each part to compute nodes or simulation tasks of other parts.

Design platform 105 may further simulate articulation of parts within a load chain. In doing so, the design platform 105 may account for the motion envelope that each part may move through, as it moves as part of an assembly and load chain. Thus, the generation of assembly parts performed by design platform 105 may take into account the dynamically changing keep-out regions created by moving parts. For example, in addition to capturing and transmitting the geometry of each part to other portions of the design environment, design platform 105 may further transfer the changing shapes of motion envelopes associated with each changing part to compute nodes or simulation tasks of other parts. Further detail regarding the design platform 105 is provided in FIG. 2.

The model interface 101, viewer application(s) 103, and design platform 105 may communicate via network 107. Network 107 may be comprised of a wireless network (employing, for example, wireless fidelity (WiFi) or satellite), a data network (e.g., a local area network (LAN), metropolitan area network (MAN), wide area network (WAN), the Internet, any packet-switched network, etc.), a private network, a public network, a cable network, etc. While FIG. 1 illustrates an embodiment in which model interface 101 and/or viewer application(s) 103 may communicate with design platform 105, alternative embodiments may include the model interface 101 and/or viewer application(s) 103 connecting directly to the design platform 105 (bypassing network 107), e.g., by being directly connected to design platform 105, part of design platform 105, or at least a portion of design platform 105 may be part of model interface 101 and/or viewer application(s) 103.

Generative design system 100 may also include one or more 3D printer(s) or other manufacturing systems. For example, one or more manufacturing system(s) may be connected to network 107 and may communicate with model interface 101, viewer application(s) 103, and/or design platform 105. In some embodiments, one or more of such components and/or the manufacturing systems may convert designed structures into manufacturing instructions or specifications for the manufacturing systems. The manufacturing systems may include additive or 3D printing manufacturing systems, including, e.g., metal printing systems.

Figure 2:
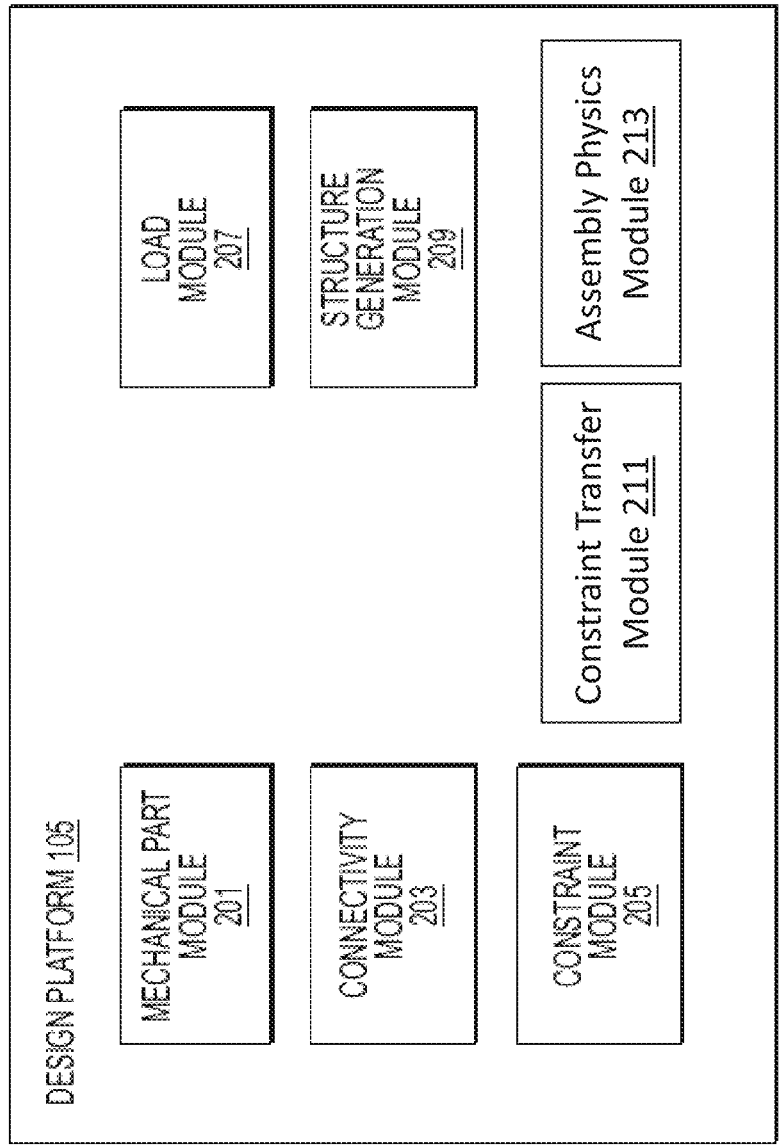
FIG. 2 depicts an exemplary embodiment of an exemplary design platform for creating structures for parts using a growth-based generative design approach, according to one aspect of the present invention.

FIG. 2 is a block diagram 200 of the design platform 105, according to some embodiments. The design platform 105 may provide a design space at a virtual workstation. The design space may comprise a simulation environment for generatively designing an assembly of parts. The design of the assembly of parts may comprise a model of a physical structure. The model may be built using topology optimization or any known generative design technique. Alternately or in addition, the design platform 105 may employ a cell-based approach to generative design, meaning the model may be built by an accretion of cells, either serially (e.g., cell-by-cell) or with multiple cells being generated in parallel. Each model may be made up of a plurality of cells. A "cell" in this instance may refer to a mathematical and/or visual, parameterized representation of a volumetric element, including physical material properties, mechanical properties, electrical properties, thermal properties, chemical properties, e.g., or a combination thereof. Exemplary physical material properties may include elastic material properties, e.g., where a cell may be comprised of a representation of one or more physical elements, including springs, dampers, and masses, according to an exemplary embodiment. A cell may also be represented as a finite element within the context of a finite element model. Mechanical properties may include elastic, plastic, brittle properties, etc. Electrical properties may include, e.g., conductive or insulating properties. Thermal properties may include, e.g., heat conduction, retention, or propagation properties. Chemical properties may include, e.g., reactive, corrosive, or phase change properties.

Given the representation of each cell as characterized by such properties, the disclosed generative design approach may model a cell's response to different kinds of stimuli, such as heat, force, and/or chemical electrical fields, etc. The cell response may be reflected in parameter values associated with each cell. Each cell of the design platform 105 may be associated with a set of parameter values. These parameter values may dictate cell actions, e.g., spawning, fusing, destruction, etc. Such cell actions may combine to build a model of each part, as well as a model of an assembly of parts. This cell-based approach is discussed in detail, for example, in U.S. Patent Publication No. 2019/0138673, entitled "Growth-Based Design System", and U.S. Patent Publication No. 2019/0294754, entitled "Systems and Methods for Growth-Based Design", both of which are hereby incorporated by reference in their entireties.

FIG. 2 depicts an exemplary embodiment of design platform 105 comprising, e.g., a mechanical part module 201, a connectivity module 203, a constraint module 205, a load module 207, and a structure generation module 209. These modules may primarily form individual mechanical parts, while generating mechanical part specifications that may allow the part to function in an assembly. The design platform 105 may further include assembly-level modules, which may strengthen, lighten, and otherwise optimize an assembly of parts. Exemplary assembly-level modules may include a constraint transfer module 211, and an assembly physics module 213. Although FIG. 2 depicts various exemplary modules of the design platform 105 as separate entities, the modules and their functionalities may be combined, separate, supplemented, or removed, in any embodiment. All or a portion of these modules (and the steps performed thereof) may be implemented in a one or more computing devices or platforms. The configurations specifically discussed herein regarding the arrangement of the components depicted in FIGS. 1 and 2 are merely exemplary, and it would be obvious to a person of ordinary skill in the relevant art that different combinations of components may be implemented on a single or multiple computing devices.

The mechanical part module 201 may model or receive models of mechanical parts and geometries of each of these parts. For example, mechanical part module 201 may receive part designs in the form of 2D, 3D, solid models, surface models, etc. Alternately or in addition, mechanical part module 201 may receive one or more modeling parameters, e.g., volumes to be filled in (comprising fill-in regions), negative spaces (e.g., keep-out regions), and boundary constraints associated with the one or more mechanical models. (Boundary constraints are described in more detail with respect to the constraint module 205.) Each part geometry of mechanical part module 201 may be considered a rigid body that may be attached to other parts through joint constraints. In some embodiments, each mechanical part may be a complete part that may be modified or shaped if necessary, or it may be a set of disconnected bodies that may be filled in via a generative design process to form a rigid part.

Mechanical part module 201 may generate a user interface for a user to set up or select one or more of these modeling parameters or models of mechanical parts. Alternately or in addition, mechanical part module 201 may receive such modeling parameters or models of mechanical parts.

The connectivity module 203 may define relationships between one or more received mechanical parts represented, e.g., in the mechanical part module 201. Such received mechanical parts may include parts which have already been modeled, e.g., in the form of solid or surface models. The mechanical parts may also include parts that have yet to have a fully formed structure, e.g., parts which have only been defined using their modeling parameters. The connectivity module 203 may permit a user to define at least two parts as bearing some relation to one another, e.g., the two parts are adjacent, touching, interlocking, connected by joints, etc. The connectivity module 203 may provide or generate a user interface for defining the connectivity of various parts received by the mechanical part module 201. In some embodiments, connectivity between parts may be defined by connectivity of the fill-in regions. For example, a user may define a volume that encloses a set of fill-in regions. The geometry of such a part may then, at least initially, completely encompass or connect these fill-in regions. For example, in topology optimization approaches, a design part of space may be created as a superset shape of the part, and regions within such a design space may be deemed to be mandatory fill in zones. Such fill-in zones may be in areas where the part may make contact with other parts. In other words, the fill-in regions may be occupied by the building material of the part.

In implementations where there may not be a starting definition of a part's macro-shape, the mechanical part module 201 may permit a user to define a part by simply identifying a set of disconnected regions or volumes which will be filled in or connected to form a rigid part. In this approach, the mechanical part module 201 may also maintain a definition of keep out zones and/or container zones that help define where generatively developed geometry that connects the part together may exist or not exist. Keep out regions may indicate where geometry may not be added, and container regions may define the bounds within which added geometry must be.

The constraint module 205 may receive, define, or manage constraints for one or more mechanical parts. Constraints may include constraints for a single mechanical part or a combination of mechanical parts. For example, constraints may include boundary constraints for a combination of parts. Such boundary constraints may include, for example, fixtures, joints, explicit ranges of motion, loads, etc. Such constraints relate to the interactions or interfaces between parts and/or fixed surfaces. The constraint module 205 may further manage or dictate modeling parameters, e.g., constraint type. Examples of constraint type may include the following: fixed (i.e., 6 degrees of freedom (DOF) locked), and joint (i.e., sliding, pin, ball-and socket, hinge, pivot, condyloid, saddle, plane).

The load module 207 may receive or set up load chains between multiple mechanical parts. For example, load module 207 may provide a user interface for setting up load chains. A load chain may comprise a collection of forces, load constraints connected to joint constraints, and load constraints finally connected to one or more fixed constraints or counteracting reaction load constraints. In some embodiments, a load chain may be set up for multiple modeled parts that are connected via joints (e.g., defined by the constraint module 205). In such a case, each part may transmit the loads through the joints in a load chain to other parts. The other parts may, in turn, transmit the loads until the loads reach predefined fixed locations. In other cases, the loads may terminate at reaction forces that cancel out the transmitted forces, rather than terminating at fixed locations. The fixed locations may be at fixed surfaces, or at part(s) in an assembly.

In some embodiments, the load module 207 may include a kinematics simulator and a dynamics simulator. An exemplary kinematics simulator may simulate the motion of a set of rigid bodies that are connected via joint constraints. For example, the kinematics simulator may simulate the movement of a four-bar linkage. An exemplary dynamics simulator may use defined forces to solve for or predict motion of the an assembly of parts, over time. In such dynamics simulations, the mechanical parts may be assumed to be rigid such that the dynamic motion may include translation and rotation of the connected parts. A different dynamic simulation may be used for parts that may be generatively designed, or for assemblies that may include generatively designed parts. For such scenarios, a dynamic simulation may simulate a part starting to plastically bend and the geometry/dimensions of the part growing thicker to resist this deformation.

The load module 207 may also allow independent static load cases to be defined. For example, a linkage may have an open state and a closed state. In each state there may be different sets of loads—for example, a linkage in an open state may experience an upward force on a surface of the linkage as well as a downward force on the surface. In some embodiments, these forces are of a level or at a location at which they do not cancel each other out. Instead, the opposing forces may be treated separately such that both the upward and downward loads may cause the structure generation module 209 to make a part strong enough to handle each load independently.

The structure generation module 209 may provide an operating environment that generates a geometry of each part in response to the stress and strain stimuli experienced by the forces transmitted through the parts, as defined by the load chains. In some embodiments, the structure generation module 209 may generate these part geometries by providing a generative design operating environment. In such generative design environment(s), parts may change shape freely within the constraints of pre-defined keep out regions, as well as in response to the keep out regions defined by the other dynamically changing part shapes (e.g., as provided by the constraint transfer module 211). The shape change may be automatic (e.g., algorithm-driven), rather than predominantly dictated by user input. For example, a user may input initial parameters, e.g., modeling parameters, constraints, loads, and the generative design environment may automatically shape the geometries of parts. This method would be in contrast to modeling environments in which a user specifies end geometries, dimensions, and shapes.

In some exemplary structure generation module 209 operating environments, each part may have its own compute node context. For example, each part's shape generation may be simulated in its own independent compute node context. Portions or subsets of the load chain may be maintained within each compute node. As an example, a compute node for part A may include the force constraints and a ball joint constraint, along with the fill-in regions for part A. An exemplary compute node for Part B may include the other half of the ball joint constraint of Part A, along with a fixed constraint and the fill-in regions for part B. In addition to maintaining portions of the load chain constraints, each compute node may send changes in the part geometries across to other compute nodes, and these changes in the part geometries may be used to prevent parts from forming shapes that may encroach upon or otherwise conflict with part geometries being generated in other compute nodes. In some embodiments, the changes to part geometries may be sent between compute nodes via a constraint transfer module 211. In some embodiments, structure generation module 209 may be configured to obtain a definition for a part from the mechanical part module 201 (e.g., design space of fill, exclude, and/or contain zones) along with relevant forces and fixture constraints. The structure generation module 209 may update a shaped based on stress and/or strain simulations that may drive the generation of the part shape. If a part is fully generated in an assembly and does not change, then it may be deemed a static part. A static part may be assembled and move as part of a linkage in the assembly, and it may generate a bounding envelope that may serve as a keep-out portion for other parts.

The assembly physics module 213 may run kinematic and dynamic solvers on parts formed by the structure generation module 209, at the assembly level. The assembly physics module 213 may also send, to the compute node of each part, relevant forces, fixtures, as well as keep out zones updated to account for changes (e.g., "deltas") of each part, as the part is formed by the structure generation module 209. In some embodiments, the structure generation module 209 may simultaneously form multiple parts. Alternately, design platform 105 may include multiple structure generation modules 209, each structure generation module 209 pertaining to a single part or set of parts.

The assembly physics module 213 may receive or determine one or more global boundary conditions across a collection of parts (e.g., an assembly). The assembly physics module 213 may also process the load chains of an assembly, for example, by applying the global boundary conditions to a linkage, moving the linkage to a position (which may be defined by setting one or more degrees of freedom), and solving for kinematics of the assembly and/or one or more mechanical parts making up the assembly. For instance, an assembly comprising a 4-bar linkage may be set to an angle and 3 moving bars of the assembly may be solved for (e.g., determining a position and orientation of each bar) in a static equilibrium configuration. The assembly physics module 213 may further provide simulations and/or part design environments in which body forces (e.g., gravity) as well as externally applied loads may be transferred through the linkage joints, and the static forces for each joint may be applied to each load module 207 (e.g., where there may be one load module 207 for each part, or where each load module 207 may manage forces along a load chain of parts). Further, the assembly physics module 213 may move a linkage through a range of motion (including a full range of motion) and generate a set of motion envelopes—one for each part. These motion envelopes may be transferred to the structure generation module 209 (or a structure generation module 209 pertaining to each part being generated). When the structure generation module 209 changes one or more part shapes, these shapes may be applied back to the mechanical part module 202 and the assembly physics module 213 so that a kinematic update can be performed. In some embodiments, the assembly physics module 213 may further include a dynamics simulator, which may allow the forces applied to a linkage or structure to cause motion which may resolve to a static state.

The design platform 105 may generate the geometries and structures of each part via generative design, based on the load transfer, movement of parts, range of movement of each part, etc.—as defined by the assembly physics module 213. While geometries and structures of each part are being generated, assembly physics module 213 may capture geometric changes between parts and transmit loads, fixtures, and dynamically updated keep-out delta regions to assembly physics module 214. Assembly physics module 213 may simulate the movement of parts relative to one another, in an assembly. This simulation of load chain articulation may occur while the part geometries are being formed. To this end, the operating environment may further simulate transfer of loads between parts (and through constraints). The modeling of part movement and transfer of loads may be simultaneous. In other words, the assembly physics module 213 may work in conjunction with the various modules of the design platform 105 to simulate multiple parts operating in a load chain, wherein parts may transmit forces through joint constraints to other parts. Such load chain stresses may be used as generative design input parameters for generating part geometries. This automatic generation of generative design parameters between parts, while parts of an assembly are being generated in tandem, provides an improvement over current design applications in which the input parameters for each part must be separately and individually computed.

The assembly physics module 213 may also simulate motion envelopes of each part, and any transmission of motion envelopes. A motion envelope may indicate the area of space that a part may move through as the part articulates in an assembly. For instance, various mechanisms within an assembly may cause a part to move. A motion envelope may comprise an area defined by the movement of the part.

The motion envelope may be dynamic, meaning a motion envelope may change as a part is generatively designed or as a part is activated in an assembly. The motion of one part may also impact the motion envelope of a second part. This impact may comprise the transmission of motion envelopes between parts. The assembly physics module 213 may take account for these transfers of not just loads, but also motion envelopes, in generatively designing parts of the assembly. For example, structure generation module 209 may ensure that designed parts do not intersect with motion envelopes of other parts or otherwise interfere with the motion of connected parts.

The assembly physics module 213 may further generate parts of an assembly simultaneously by propagating shape changes across multiple parts, or to an environment surrounding each part. For example, as a first part expands during the generative design process, the assembly physics module 213 may cause neighboring parts to recede or otherwise change shape so as to accommodate the shape change of the first part. The structure generation module 209 may also note the expansion of the first part into the environment surrounding the first part and may detect any keep-out regions that the first part may approach as it expands. In this way, multiple part geometries may be generated simultaneously, while avoiding intersections and unwanted overlaps between pre-set fill-in regions of various parts (e.g., as maintained by mechanical part module 201, part connectivity module 203, or constraint module 205).

In short, the design platform 105 may permit a user to define initial generative design parameters, including joint constraints and multi-part load chains, for multiple parts of an assembly. The design platform 105 may then export these initial design parameters from a setup environment (e.g., user interface), into various part generative design simulation environments. Alternately or in addition, design platform 105 may provide one design space comprising both the setup environment and the simulation environments. In such embodiments, the simulation environments may be populated with or may receive initial design parameters. One or more parts of an assembly may have its own simulation environment, and each simulation may include a portion of the load chain.

Each simulation environment may then simulate generation (or growth) for one part. The simulation may take into account the initial parameters/constraints, as well as changes to the constraints over time. For example, the positions of constraints may shift as parts are generatively designed. Additional constraints may also be introduced as a generatively designed part develops. For instance, fixed forces may be added if a part develops towards a fixed surface. Alternately or in addition, initially identified forces may shift, increase, or decrease as a part expands or develops.

Simulation environments may communicate with each other to convey geometric changes being made to each part, as well as motions from mechanism/assembly articulation, or changes to geometry motion envelopes, based on defined connectivity between parts (as defined in the initially defined load chain). Accordingly, the initial design parameters may drive the generation of various parts of an assembly, which may be assembled as components in a load chain.

Figure 3C:
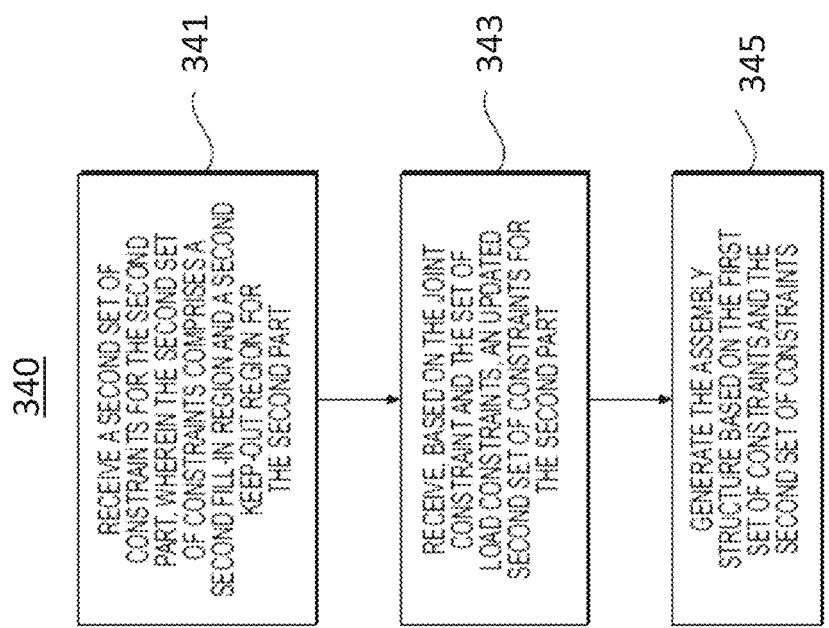

FIGS. 3A, 3B, 3C, and 4 are flowcharts of exemplary methods of forming mechanical parts in an assembly. In particular, the method of FIG. 3A describes a basic method of generatively forming a single mechanical part, which is known to be part of an assembly. FIG. 3B details a method of defining design parameters for the single mechanical part, based on its relation to at least one other mechanical part. FIG. 3C includes a method of forming a second part which may connect to a first part, as part of an assembly.

Figure 4:
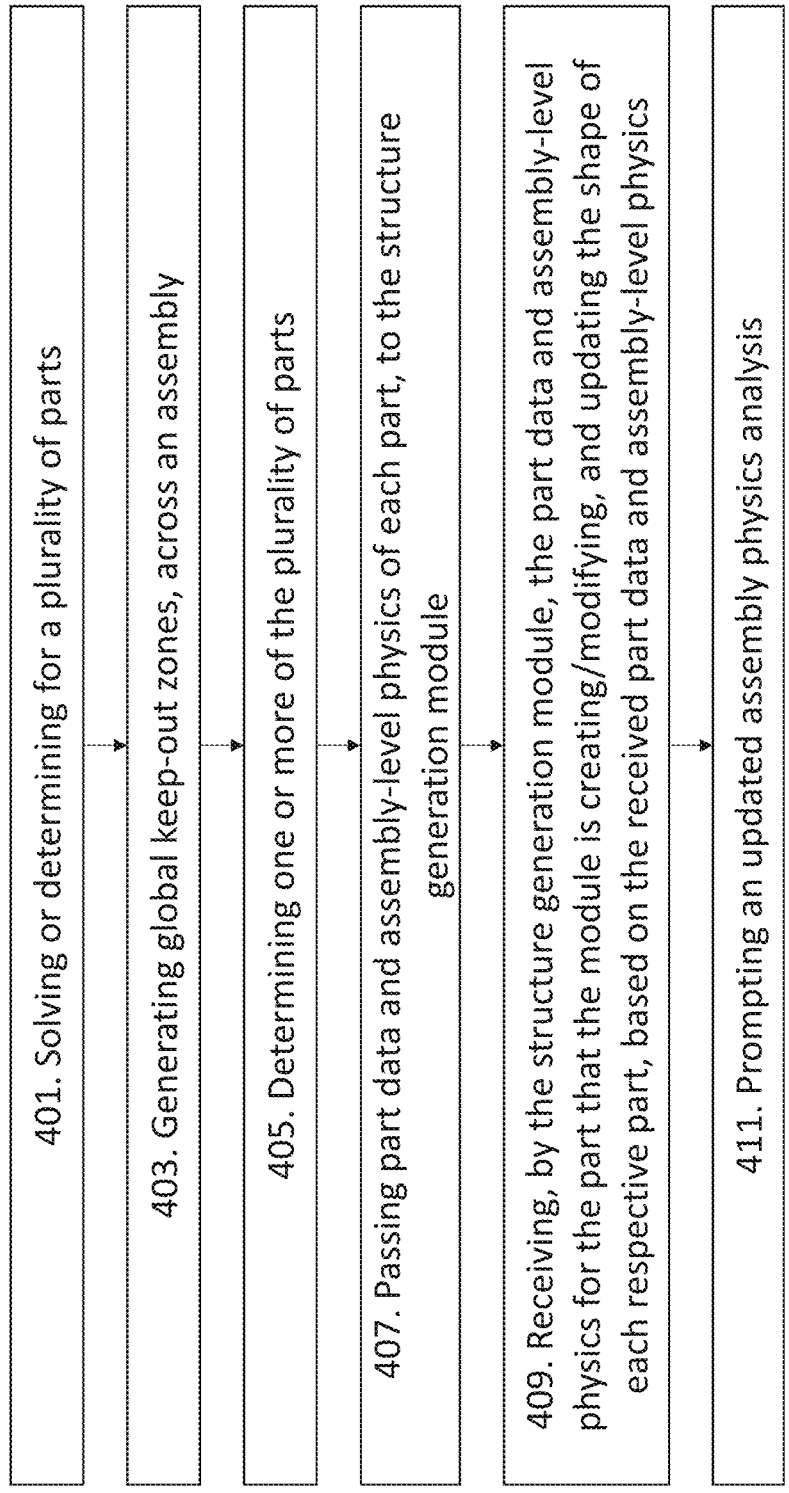

FIG. 4 includes a method of generating an assembly of parts, e.g., a structure having a plurality of related and/or interconnected mechanical parts. In particular, FIG. 4 includes a method for building static assemblies and/or linkage assemblies. The static assembly phase may include a part generation process in which the parts do not move, but as one part grows larger it may cause other parts to shrink so as to respect keep out zones around mating regions. The linkage assembly phase may include simulations and modeling in which part(s) may move through a range of motion. Such motions may create motion envelopes for each part, as well as snapshots at different articulation points. In some embodiments, forces may be different at each articulation point (e.g., linkage open versus closed) and there may be multiple load cases applied to each articulation point.

FIG. 3A is a flowchart of an exemplary method 300 of forming a first part of an assembly of mechanical parts. Step 301 may include receiving a first set of constraints for a first part. For example, the first set of constraints may comprise a first fill-in region and a first keep-out region for the first part. The constraints may be received, for example, from a user, from a database, from a design file, or from another source, via, e.g., a user interface, such as a user interface generated or provided within the design platform 105. Step 303 may include determining a spatial relationship between the first part and a second part. The spatial relationship may include relative positions in a design workspace, occupied by at least a portion of the first part and a portion of the second part. While the precise geometry and structure of the first part and the second part may be undefined, step 303 may include determining or receiving constraints which may define relationships between parts in an assembly. The spatial relationship may fall into basic groups, e.g., static parts, movable parts connected by joints, or stretchable parts connected by floating constraints. Static parts may refer to parts that do not move relative to one another, but the geometry of each part may serve as a keep-out region for other parts. For example, a fill-in region for the first part may serve as a keep-out region for the second part, so the two parts are not conjoined or do not undesirably interfere with one another. Movable parts connected by joints may include parts which may move relative to each other. The movement may be enabled and constrained by joint connections between the parts. In addition, motion envelopes of the first part and second part (combined), may define keep-out regions for other parts of an assembly. Due to their movement in the motion envelope, such keep-out regions may be dynamic, in some embodiments. In one instance, step 303 may include defining a connectivity of a fill-in region of the first part with a fill-in region of the second part. Determining the spatial relationship between the first part and the second part may include determining an interface, connection, or interlocking portion between the first part and the second part. In some embodiments, the spatial relationship between the first and second part may be based on one or more joint constraints. For example, the one or more joint constraints may include one or more of the following: interface, connection, or interlocking portion between the first part and the second part, a joint joining the first part and the second part, a sliding constraint to a hinge, ball/socket, a fixed locked constraint, etc.

These relationships may be input by a user via a user interface generated/provided by the design platform 105. Alternately or in addition, these relationships may be determined based on stored or machine learning data regarding a part's function. For example, design platform 105 may maintain or access a database of stored relationships between parts. An example of a stored relationship may include a paring of a ball-shaped part with a mounting socket part. Machine learning data may include learned relationships between parts, e.g., from prior design projects or parts built by design platform 105. For example, machine learning techniques may be applied to a training data set of designed, fully-formed assemblies. Machine learning may then be used to predict spatial relationships between parts to be designed. The spatial relationships may include positional relations between parts in an assembly, as well as functional relations between parts. For example with the ball-shaped part and the mounting socket part, the spatial relationship may include the ball-shaped part being housed in a bowl-shaped cavity of the mounting socket part. These spatial relationships are described in more detail in the description for FIG. 3B.

Step 305 may include updating the first set of constraints for the first part based on the spatial relationship between the first part and the second part. For example, step 305 may include updating a fill-in region and/or a keep-out region of the first part, based on a set of load constraints related to the determined spatial relationship between the first part and the second part. Step 305 may also include updating a fill-in region and/or a keep-out region of the first part based on an assembly structure. As discussed for FIG. 3C and FIG. 4, the second part may also be updated based on updates to the first part. For example, the first part may be updated in a way that may encroach on the geometry of the second part. In such cases, the geometry of the second part may be moved, shaped, or reduced to avoid interferences with the encroaching geometry of the first part. Updates to the second part (in response to the first part) may also be performed during step 305 and are discussed in more detail at FIG. 3C and FIG. 4.

Step 307 may include generating a model for the first part based on the updated first set of constraints. The model may include a generatively designed virtual model of the structure and geometry of the first part. In some embodiments, the model of the first part may be automatically built using the previously-described cell-based approach of generative design.

FIG. 3B is a flowchart of an exemplary method 320 of determining a spatial relationship between a first part and a second part, in order to form the first mechanical part of FIG. 3A. Step 321 may include identifying a boundary constraint between the first part and the second part. Boundary constraints may include fixtures, joints, ranges of motion, loads, etc. In one scenario, step 321 may include identifying a spatial relationship comprising a joint between the first part and the second part.

Step 323 may include determining a joint constraint associated with the determined joint (e.g., of step 321). A joint constraint may include any parameters that may define the joint. For example, a joint constraint may include a constraint type, e.g., "fixed", "joint", or "force." A constraint type of "fixed" may refer to an immobile or locked relation between the first and the second part, at a surface selected by a user. The surface may be fixed (e.g., a wall). A surface may also be a surface on a formed, or forming, part. A constraint type of "joint" may denote, for example, a sliding, pin, ball-and socket, hinge, pivot, condyloid, saddle, or plane joint between the first part and the second part. The joint may lie at a location of the selected surface or the selected surface may form at least part of the joint. A constraint type of "force" may refer to a friction relation between the first part and the second part, at the selected surface. Parts may make contact through joints and fixtures. For example, in a 4 bar linkage, the floor may be considered a static fixed part that does not grow or change shape. The floor may have rotational pivot joints, and the other parts may connect through joint constraints. Referring to the skateboard part disclosed herein, the base part may have a fixed surface on a bottom and a ball and socket joint on the top. The top part may have a ball and socket joint and loads on the axles.

An example of a force constraint may be a force applied to a surface such as an axle force. In some embodiments, the force may be a pressure force, a torque (rotational force), or any force on a surface. In a joint, there may also be friction forces. For example, the leg of a table on a floor may have a sliding constraint along the floor surface, and the joint may exert a friction force to the chair leg parallel to the floor surface with an equal and opposing force on the floor at the point of contact. There may also be damping forces in a joint, where the damping force is a function of velocity. This may not apply to a linkage moving through a kinematic range of motion with static positions or states. In some embodiments, the motion may cause damping forces that are a function of the velocity.

In one scenario, step 321 may include prompting a user to select a fixed surface via, for example, model interface 101. In some embodiments, the user may use the model interface 101 to define parts with sets of geometry bodies for each. The user may define which disconnected bodies should be connected to form rigid parts. The user may define joint constraints, loads, and/or fixtures. The user may also define explicit limits on motion. In some embodiments, such information may be imported from an existing assembly where joint constraints have been determined (or set up) in the context of the model interface 101, e.g., a CAD model. An alternate or additional step 321 may include prompting a user to select a surface of the first part. The surface may be part of a defined fill-in region, where a user may be prompted to identify which regions of a first part's fill-in regions are connected to fill-in regions of the second part. A joint may reside on the selected surface. While the part may not yet have a full geometry or structure, the generative design functionality of the design platform 105 may fill or connect the defined fill-in regions using generative design techniques. Step 323 may entail determining a joint constraint for the determined joint by associating the selected surface with a constraint type, e.g., "fixed", "joint", or "force." Alternately or in addition, step 323 may include determining a joint constraint, wherein the joint constraint comprises a first range of motion for the first part and a second range of motion for the second part. In one scenario, the second range of motion may comprise a keep-out region for the first part.

Step 325 may include determining a set of load constraints associated with the spatial relationship between the first part and the second part, wherein the set of load constraints comprises one or more loads transmitted between the first part and the second part. The set of load constraints may be associated with a joint constraint (e.g., of step 323), and the set of load constraints may comprise one or more loads transmitted through the first part to the second part, via a joint part associated with the joint constraint. For example, each joint constraint may be associated with a load constraint. The load constraint may define a load transfer that may occur at a joint associated with the joint constraint. Step 325 may include setting up a load chain comprising a collection of one or more load constraints. The load chain may comprise a one or more load constraints associated with joints on the first and second part. The load chain may start at one joint between two parts and extend to one or more fixed constraints or counteracting reaction load constraints. Such a load chain may define the parameters of a mechanical part which may transmit loads, though its joints, to other parts. The other parts may, in turn, transmit the loads until they reach the fixed locations (denoted by the fixed constraints or counteracting reaction load constraints). The counteracting reaction load constraints may include reaction forces that cancel out transmitted forces. In some embodiments, load constraints may be applied in conjunction with fixture constraints, e.g., applied to surfaces on the parts. These loads may be transferred through the joints so that the forces applied to a first part may transfer to a second part through joints.

FIG. 3C is a flowchart of an exemplary method 340 of generating an assembly structure comprising the first part and the second part of FIGS. 3A and 3B. As seen from FIG. 3A, method 340 may be a continuation of method 300. In such a case, a first set of constraints for a first part may be defined prior to executing method 340. Step 341 may include receiving a second set of constraints for the second part, wherein the second set of constraints may include, e.g., a second fill-in region and a second keep-out region for the second part. The second set of constraints may also account for the first set of constraints for the first part (e.g., from FIG. 3A), in addition to the second part. For example, the second set of constraints may further include keep-out or fill-in regions associated with the first part, as well as any ranges of motion associated with a linkage between the first part and the second part. In some embodiments, equal and opposite forces exerted by the first and second parts on each other at a point of contact or joint may be considered as a parameter for the two parts, e.g., first and second set of constraints.

Step 343 may include receiving or determining, based on the joint constraint and the set of load constraints (e.g., from method 320), an updated second set of constraints for the second part. Step 345 may include generating the assembly structure based on the first set of constraints and the second set of constraints. The first set of constraints may include, for example, a first fill-in region and a first keep-out region for the first part (as received in step 301 of FIG. 3A). Alternately or in addition, the first set of constraints may include the updated first set of constraints (as generated in step 307 of FIG. 3A). The second set of constraints may include the received second set of constraints (e.g., from step 341) or the updated second set of constraints (e.g., from step 343).

FIG. 4 is a flowchart of an exemplary method 400 of generating static assemblies or linkage assemblies. In some embodiments, method 400 may build an assembly structure comprising the first part and the second part of FIGS. 3A-3C. Method 400 may be performed, for example, by assembly physics module 213 and/or any other modules or combination of modules of the design platform 105.

Step 401 may include solving or determining assembly-level physics (e.g., kinematics, load propagations, etc.) for a plurality of parts (e.g., the first part and the second part from FIGS. 3A-3C)

Step 403 may include generating global keep-out zones, across an assembly. Such keep-out zones may be motion-based, especially for a linkage assembly. In some embodiments, the global keep-out zones may be generated by performing or simulating a sweep of the total motion of an assembly, e.g., based on the determined/solved kinematics of each part from step 401. A set of "total motion envelopes" for each part may be generated based on the motion of the assembly. Intermediate positions between the perimeters of the total motion envelope may also be determined, e.g., by simulating or modeling the assembly being articulated through a set of steps to generate articulation states. For example, for an assembly comprising a four-bar linkage, the "total motion envelope" for each part may include a left extreme position and a right extreme position, and the intermediate state may include a middle state that the part moves through, between the left extreme position and the right extreme position.

Step 405 may include determining one or more forces, fixtures, and delta keep out regions for each part of the plurality of parts. Step 407 may then include passing part data (e.g., dimensions or specifications) as well as assembly-level physics of each part, to the structure generation module 209 (or to a respective structure generation module 209 for each part). The structure generation module 209 (or each structure generation module 209) may then receive the part data and assembly-level physics for the part that the module 209 is creating/modifying, and update the shape of each respective part, based on the received part data and assembly-level physics (e.g., step 409). For example, structure generation module 209 may be prompted to verify or update the shape of a mechanical part, so that the part does not occupy or interfere with any of the keep-out regions for the total motion envelope or for any intermediate states. The structure generation module(s) 209 may further be prompted to update the shape of a respective mechanical part to ensure that the part can sustain the received loads (e.g., from forces and fixtures from step 405).

Step 411 may include prompting an updated assembly physics analysis, based on the updated shape of the respective mechanical part. For example, when the part geometries for a first mechanical part, a second mechanical part, and a third mechanical part are updated, the parts may be processed by the assembly physics module 213 to update the total motion envelopes for all associated parts, for example, in the assembly. The updated motion envelopes may then be redistributed to the respective structure generation modules 209. Each structure generation module 209 may update the shape of each respective part to respect the updated forces/fixtures/keepout regions for the module. The updated part geometry may be passed back to the assembly physics module 213 where the system, e.g., the assembly may be solved again. Accordingly, this may result in a new set of keepout zones (including updated motion envelopes).

As an exemplary illustration of method 400, a first part and a second part may be generated, and the first part may grow relatively larger based on current forces. When the updated part shape for the first part is passed to the assembly physics module 213, the static or motion based keepout regions, e.g., envelope, may be updated and passed to each structure generation module 209. During this process, the second part may be made smaller to avoid the first part's envelope, but the second part may be made stronger elsewhere to account for it being weakened in order to avoid the first part's envelope.

In some embodiments, method 400 may be an iterative process that may continue until all parts reach an equilibrium. Equilibrium may refer to a state in which the parts no longer need to grow in order to hold the loads placed upon them, and each of the parts do not interfere with each other.

The methods described and depicted with reference to FIGS. 3A, 3B, 3C, and 4 may be an iterative process where the shape of a second part may cause an update to its motion envelope—which may cause a first part to change shape. This may, in turn, cause a change to the first part's motion envelope that causes the second part's shape to change. This process may continue through further iterations. The parts may therefore continue updating (iterating) until the motion envelopes of each part no longer encroach and where the forces on each part are satisfied by the resulting geometry generated for each part.

Figure 5A:
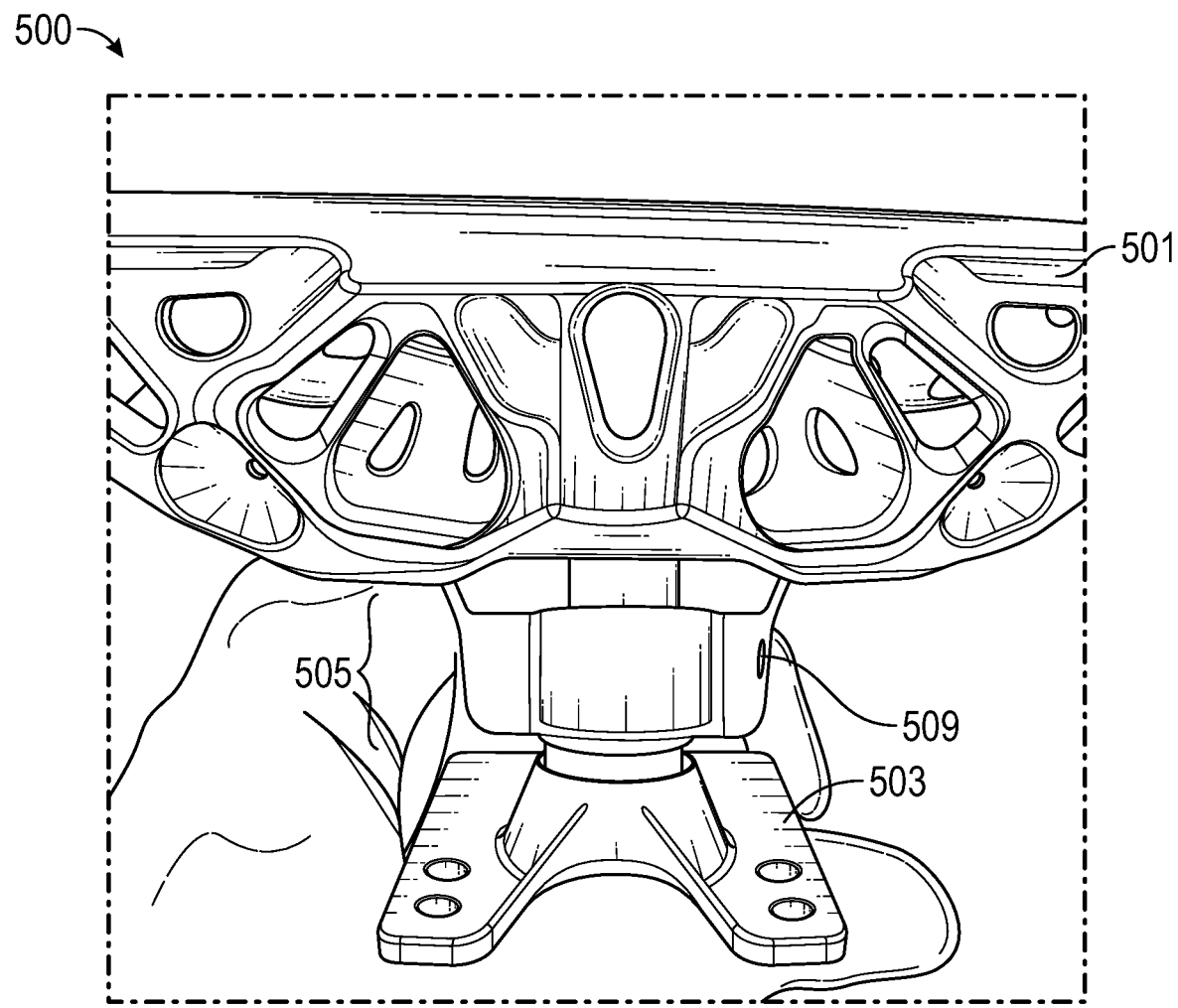
FIGS. 5A, 5B, 5C, 5D, 5E, and 5F depict stages of initial setup and generative design of an assembly, according to one aspect of the present invention.
Figure 5B:
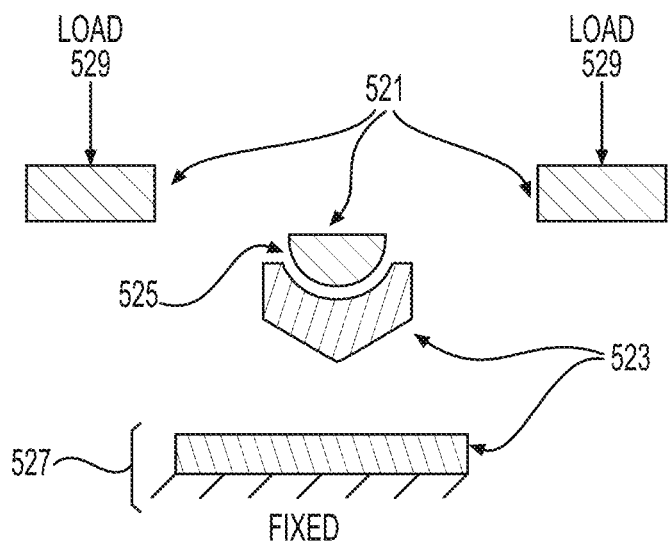
Figure 5C:
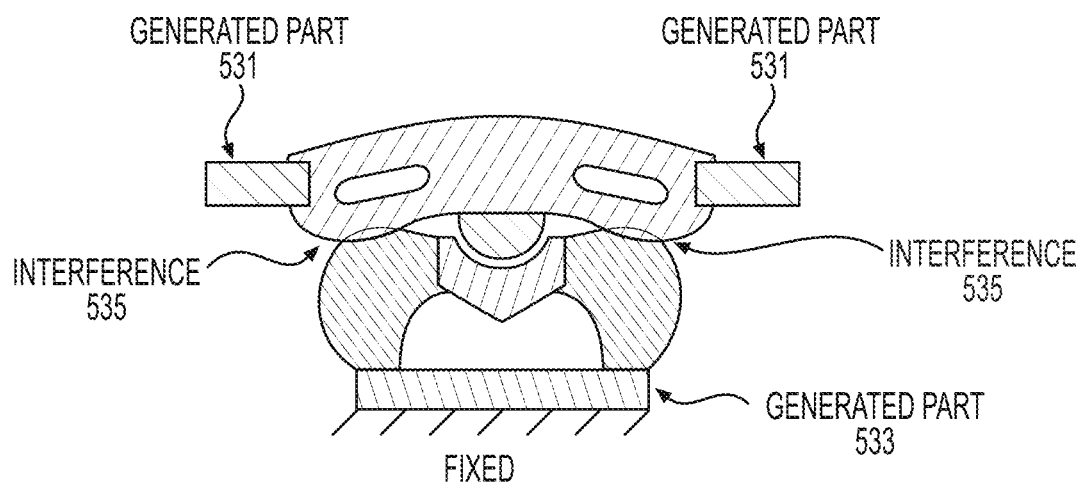
Figure 5D:
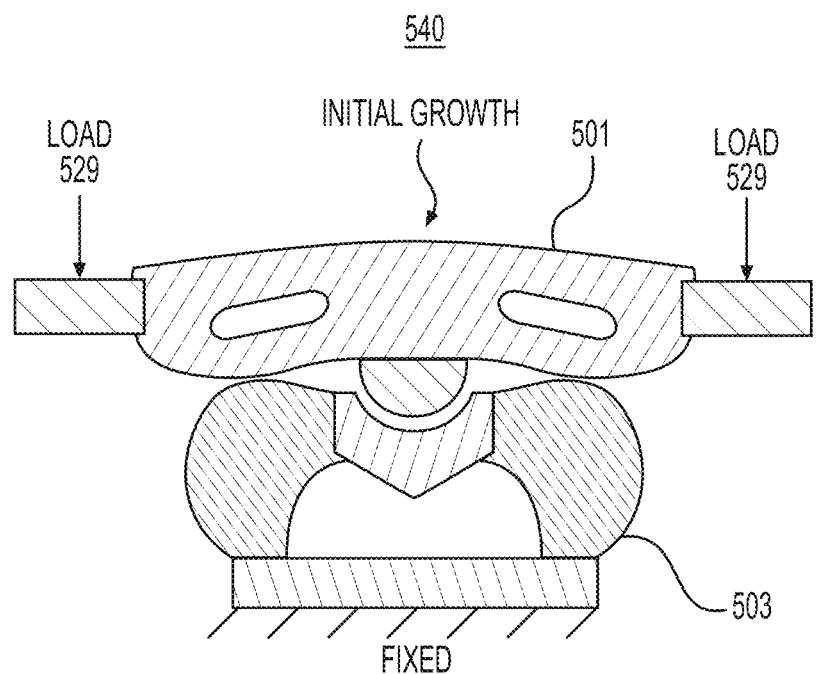
Figure 5E:
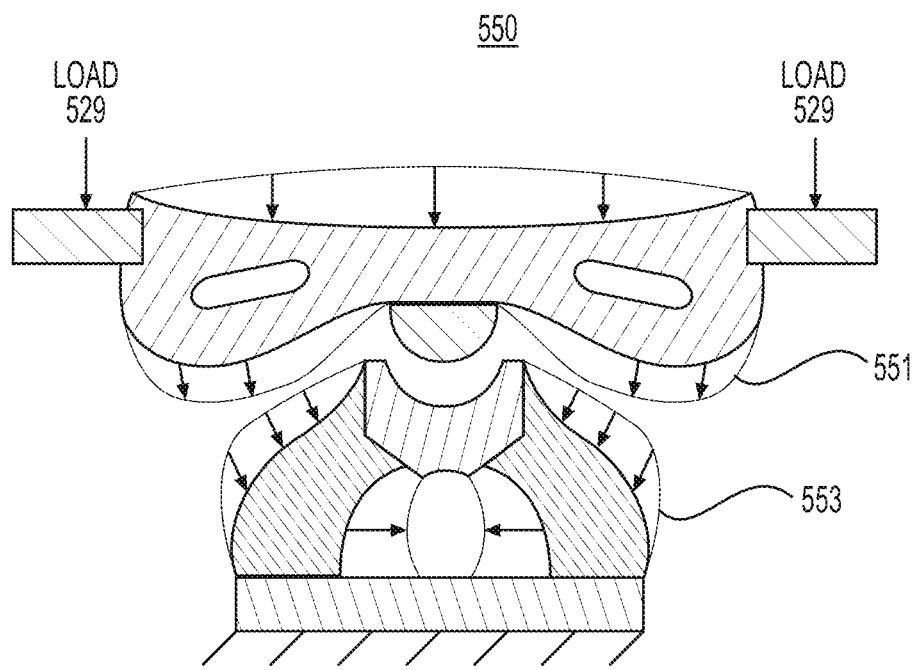
Figure 5F:
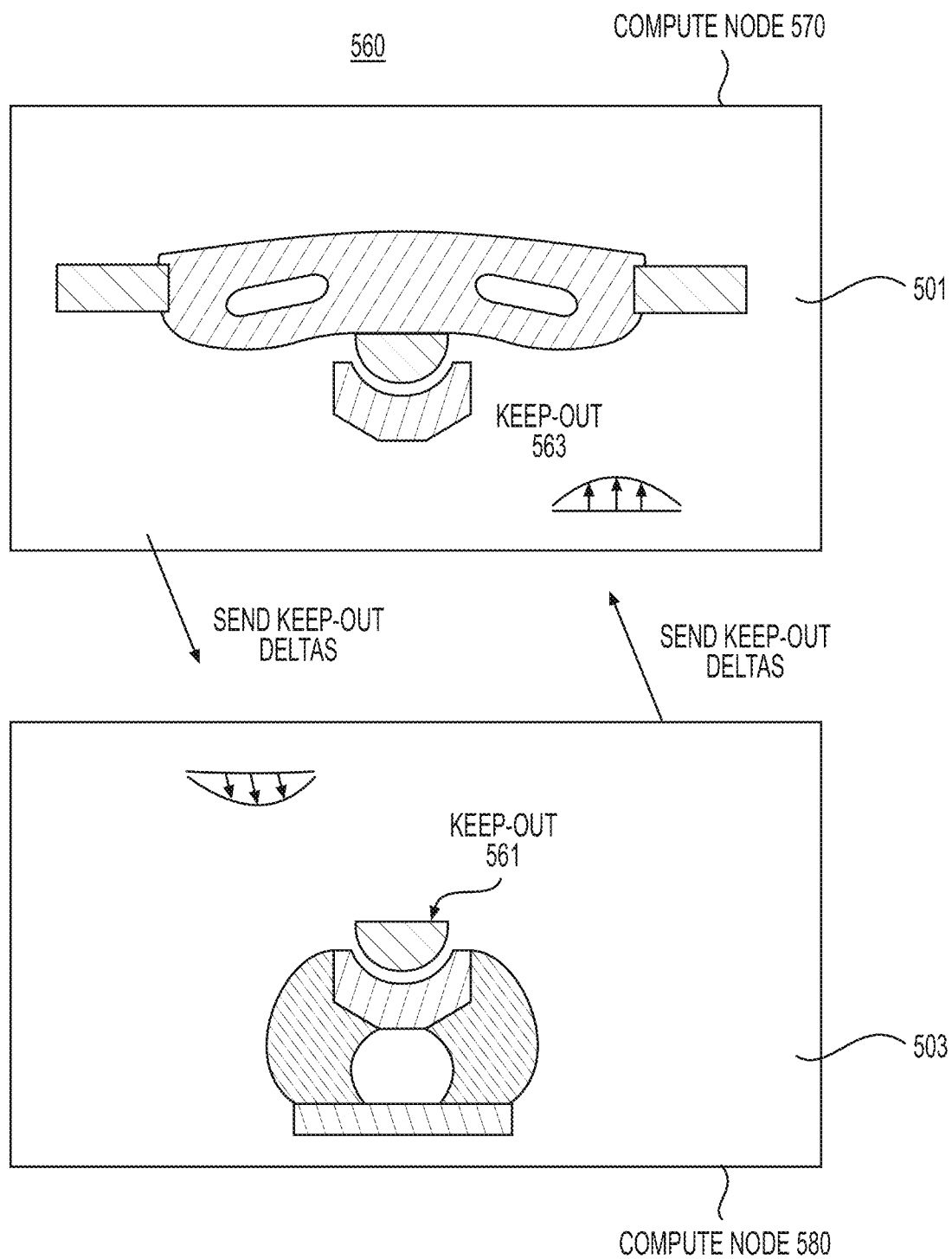

FIGS. 5A-5F illustrate the implementation of methods 300, 320, and 400. In particular, FIG. 5A is a representation of a final assembly 500, generated by the exemplary design platform 105. FIG. 5B depicts an initial set-up for generating assembly 500. FIG. 5C depicts an instance of an error case of an assembly, where the generated assembly contains interferences between generated parts. This error case is shown, in contrast to the depictions of FIGS. 5D-5F, which illustrate the simultaneous, assembly-level part design techniques previously discussed. The depictions of FIGS. 5D-5F are also exemplary of user interfaces and displays, which may be rendered by the design platform 105.

FIG. 5A depicts an exemplary final assembly 500, generated by design platform 105. Assembly 500 may include a first part 501 and a second part 503, joined by a ball joint 505. The ball joint may be composed of a pin 507 resting in a cup 509. Pin 507 may be a component of part 501, and cup 509 may be part of the structure of part 503.

Interface 520 of FIG. 5B depicts an initial user interface, in which a user may define initial constraints for an assembly of first part 501 and second part 503, shown fully generated in FIG. 5A. For example, regions 521 may include defined fill-in regions for part 501. These regions may define volumes in the design space of design platform 105, which part 501 may be required to occupy. Regions 523 may include defined fill-in regions for part 503. These regions may be volumes in the design space, which part 503 may be required to occupy. A boundary constraint, e.g., contact joint 525 between (not yet formed) part 501 and part 503 may also be defined. Interface 520 may further permit a user to define a constraint relative to a surface, e.g., constraint 527. In interface 520, constraint 527 is set as a fixed constraint, which may dictate that part 503 be fixed relative to the surface at constraint 527. In such a scenario, part 503 may have no movement relative to the surface. Interface 520 may further allow a user to define a load 529. Load 529 may be intended to simulate a real-life force load that may be applied to the assembly during use of a part generated by design platform 105, once fully formed and manufactured. In interface 520, the load 529 is defined relative to a fill-in region 521 of part 501, but loads may be defined at fill-in regions, keep-out regions, surfaces, joints, or any location in a design space.

FIG. 5C illustrates an error case 530 of completed part 531 and part 533, in which there is at least one interference 535. As shown by FIG. 5C, generatively designed part 531 intersects with generatively designed part 533 at interferences 535. Such errors may occur when parts are developed in isolation, or without knowledge of the space requirements/keep-out regions of other parts in an assembly. To achieve the final assembly 500 of FIG. 5B, in which part 501 and part 503 do not erroneously intersect or link, design platform 105 provides a generative design environment as shown by FIGS. 5D-5F.

FIGS. 5D-5F illustrate an assembly generative design environment (and user interface), which may be executed by design platform 105. In this design environment, geometries for parts in an assembly may serve as keep-out regions for one another. For example, geometry for part 501 serves as a keep-out region for part 503. Further, as one part grows, a corresponding part may shrink. To illustrate, FIG. 5D shows a growing assembly 550, in which generating parts 501 and 503 do not intersect. At an initial growth suite of the generative design process, part geometries may often be clear of one another. FIG. 5D shows an assembly 550 at a point in the generative design process in which a portion 551 of part 501 may start to interfere with part 503. In such a case, design platform 105 may cause part 503 to change shape to avoid interference with part 501. For example, part 503 may shrink and enact shape change 553 to avoid intersecting portion 551 of part 501. Thus, changes in one part ma cause complementary changes in another part so that the two parts form together with each other so as to maintain compatibility.

FIG. 5F illustrates a possible computing environment 560, in which each part of the assembly is generated on its own compute node. For example, part 501 may be generated at compute node 570 and part 503 may be generated at compute node 580. Compute nodes 570 and 580 may send geometry shape changes (e.g., "deltas") to one another. In some embodiments, shape changes may be passed through assembly physics module 213 so that kinematics may be solved to update the respective motion envelopes for each respective part. For example, compute node 570 may send geometric changes in part 501 to compute node 580 as changes to keep-out regions. Compute node 580 may note geometric changes in part 503, and send updates to keep-out regions to compute node 580. For example, keep-out region 563 may be the keep-out region reflecting a space occupied by part 503. In other words, keep-out region 563 may be a space that part 501 may not occupy, due to part 503 occupying that region. Keep-out region 561 may be the keep-out region reflecting a space occupied by part 501. Region 561 may then be a keep-out region for the development of 503, in which part 503 cannot occupy the space designated by keep-out region 561. Compute node 570 may send a geometric change in part 501, to compute node 580. Compute node 580 may then update keep-out region 561, in view of the received geometric change to part 501. Similarly, compute node 580 may send a geometric change in part 503, to compute node 570. This geometric change to part 503 may be used to update keep-out region 563 of part 501.

Figure 6A:
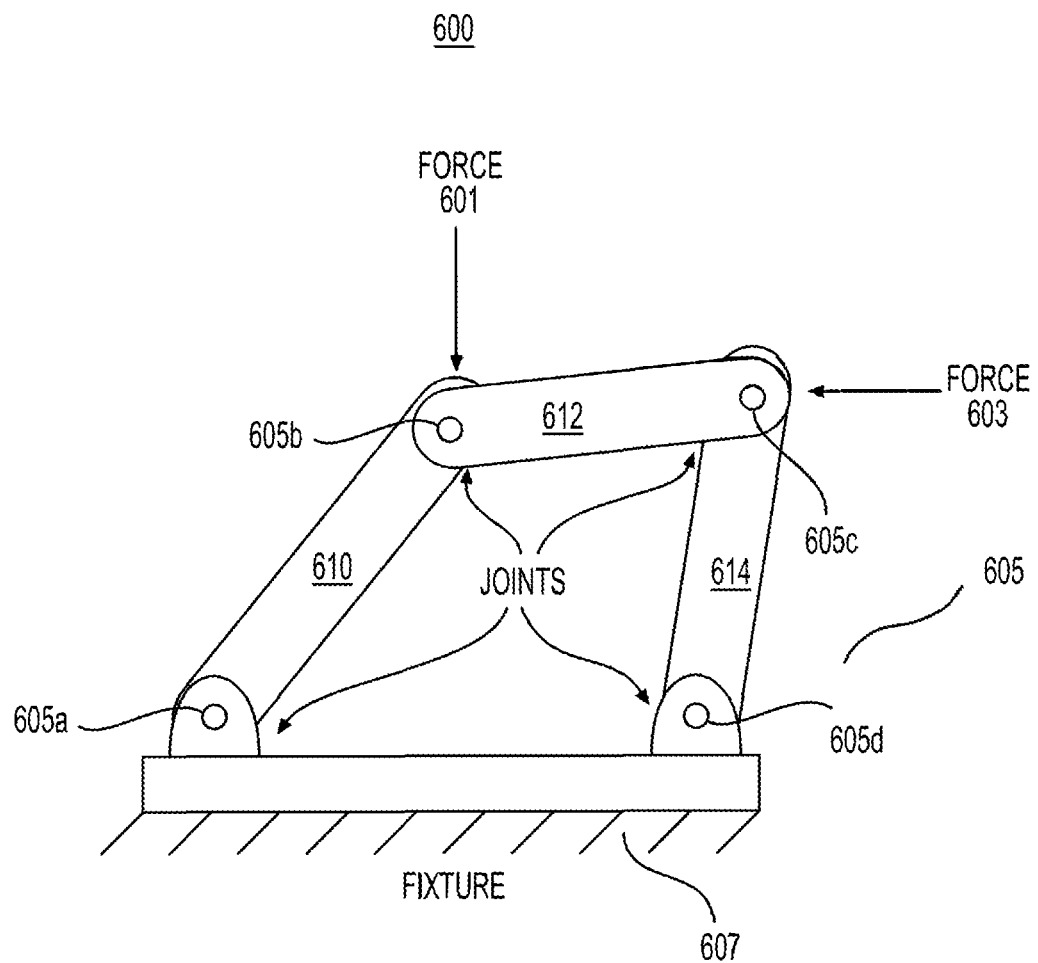
FIGS. 6A, 6B, 6C, 6D, 6E and 6F depict load chains and adaptive generative design of an assembly, according to one aspect of the present invention.
Figure 6B:
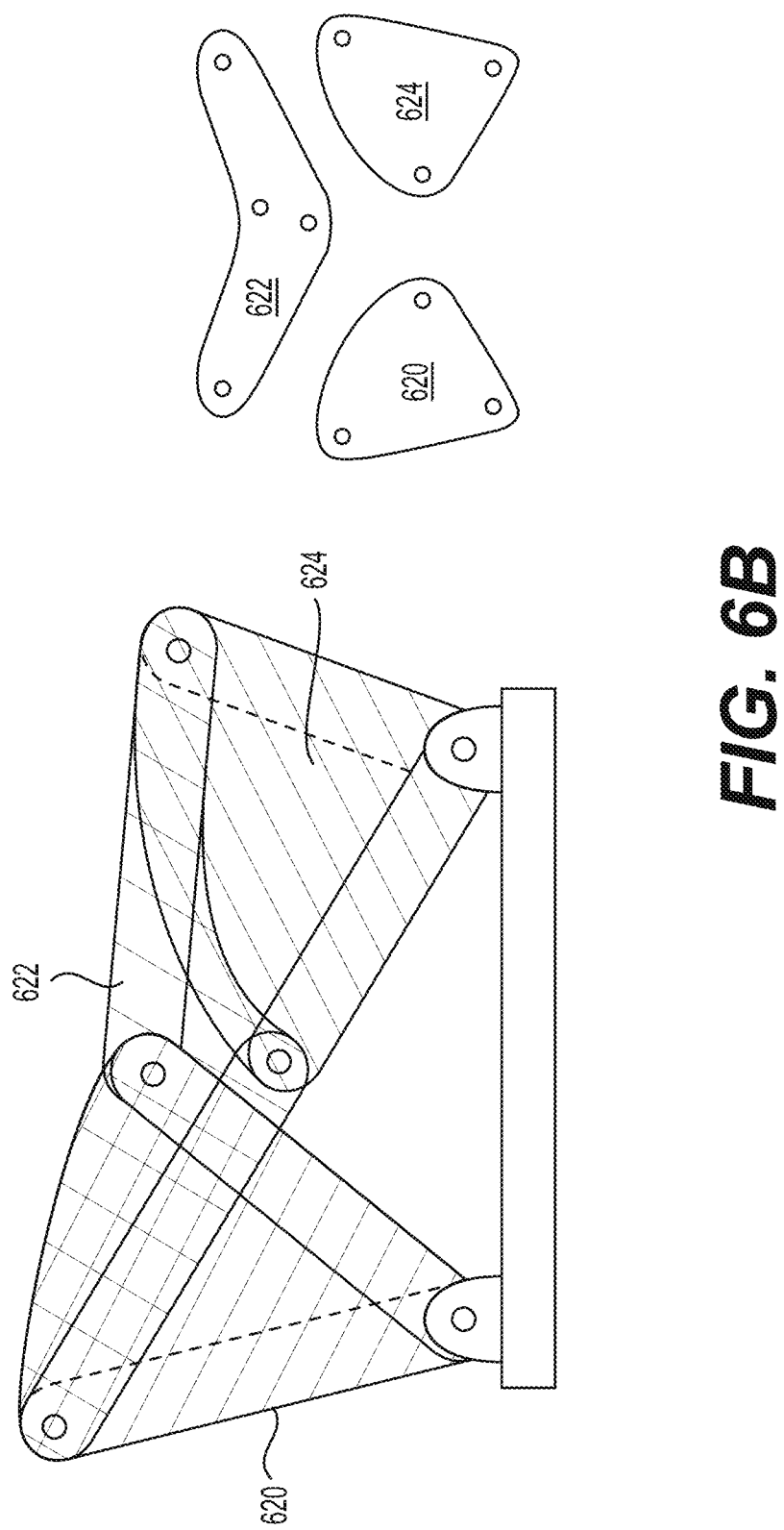
Figure 6C:
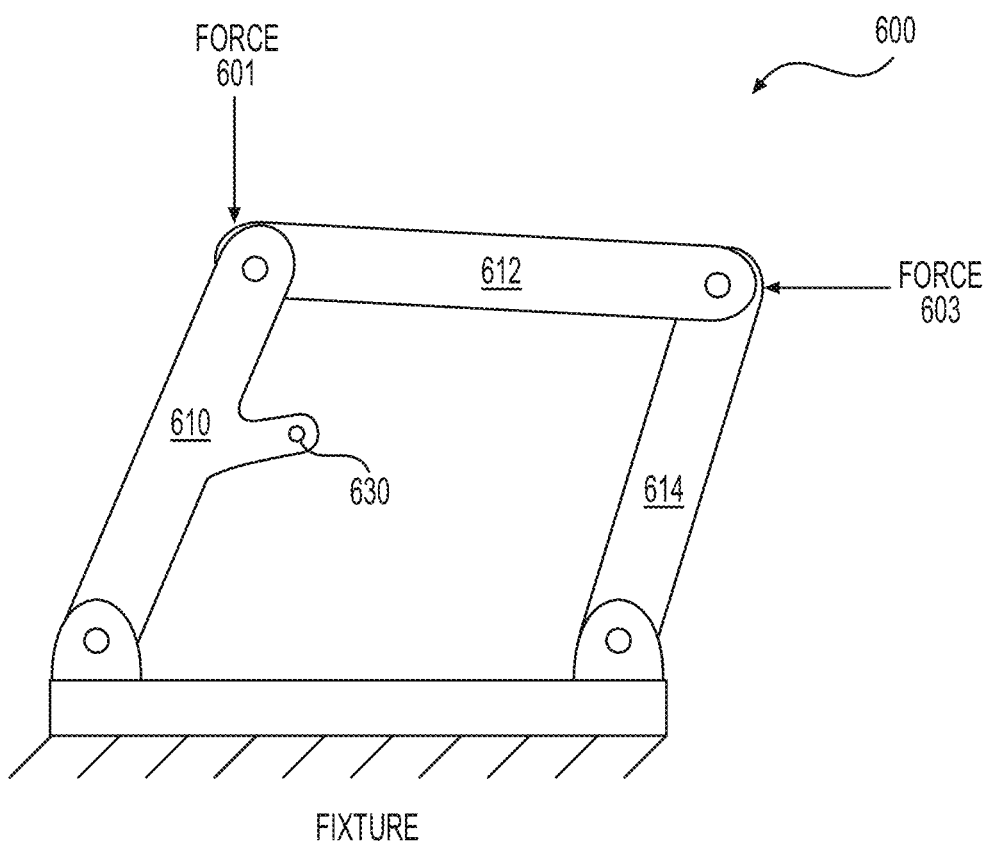
Figure 6D:
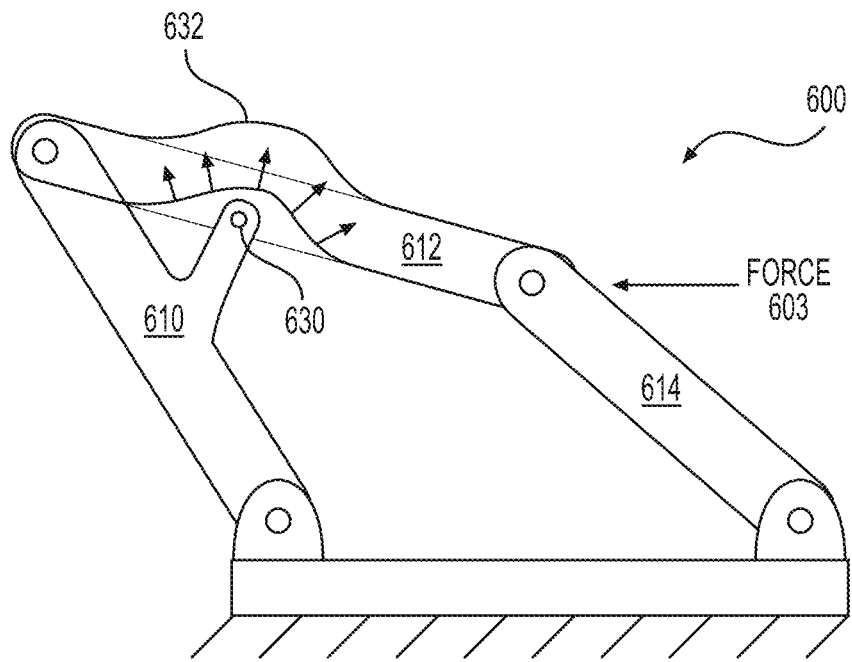
Figure 6E:
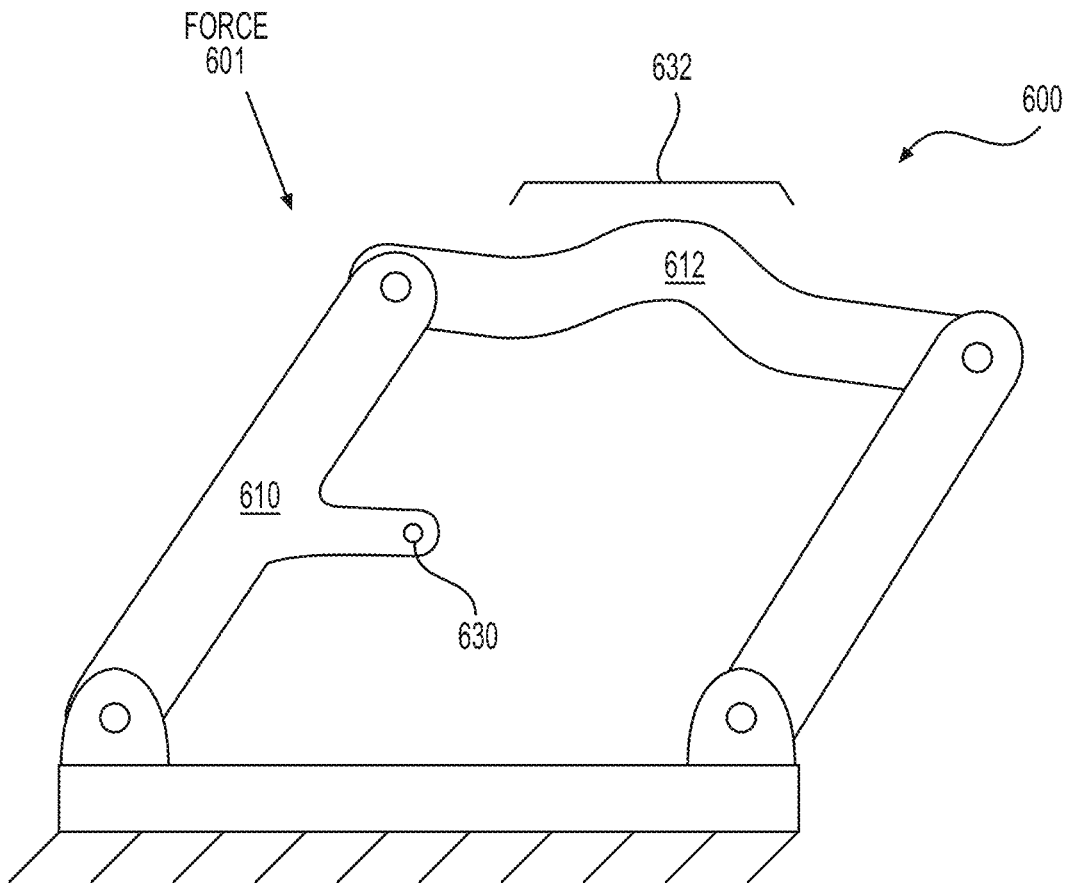

FIGS. 6A-6E depict steps (and user interfaces) related to modeling an exemplary load chain. FIG. 6A illustrates an exemplary load chain 600, FIG. 6B depicts motion envelopes associated with articulation of load chain 600, and FIGS. 6C-6E depict an instance of generatively design an assembly of parts, while accounting for the motion envelopes.

FIG. 6A depicts an exemplary load chain 600. The load chain 600 may be initially defined by a user, via a user interface provided using design platform 105. The exemplary load chain 600 includes three mechanical parts: part 610, part 612, and part 614. The parts may experience at least two forces: force 601 and force 603. The three parts may be connected via a series of joints 605 (comprising joint 605a, joint 605b, joint 605c, and joint 605d). The load chain 600 of three parts may be fixed to a surface 607 via, for example, joint 605a and joint 605d. The joints 605 may form a linkage among the part 610, part 612, and part 614. The linkage may be an articulating mechanism, where each point moves to form a motion envelope.

FIG. 6B depicts motion envelopes of each mechanical part, due to the articulating mechanism and load chain. For example, motion envelope 620 may be the motion that part 610 may sweep through, as load chain 600 articulates. Motion envelope 622 may encompass the motion of part 612, and motion envelope 624 may illustrate the range of motion of part 614. Each motion envelope may serve as a keep-out region for the other parts. For example, motion envelope 620 of part 610 may serve as a keep-out region for part 612 and part 614. Motion envelope 622 of part 612 may be a keep-out region for part 610 and part 614, and similarly, motion envelope 624 of part 614 may be a keep-out region for part 610 and part 612. In some embodiments, the entire motion envelope may serve as a keep-out region for other parts.

In other embodiments, each envelope may be a dynamically-changing keep-out region, as the entire load chain 600 occupies various spaces in a design space during its articulation. For example, when load chain 600 is in its position at FIG. 6A, another part or assembly (not shown) may occupy a space to the left of load chain 600. At this position, the motion envelope of part 610 may not serve as a keep-out region for the part/assembly to the left of load chain 600. As force 603 is applied, load chain 600 may articulate by moving through its motion envelopes 620, 622, and 624. As part 610 rotates about joint 605a, part 610 may become a keep-out region for the part/assembly to the left of load chain 600, In such a case, the part/assembly to the left may occupy the area to the left of load chain 600 while part 610 is on one end of its motion envelope (e.g., at the position of FIG. 6A), but cannot occupy the area to the left of load chain 600 once part 610 rotates left around joint 605a.

The motion envelopes may be defined by part 610, part 612, and part 614 as the parts move within each of their "allowed Degrees of Freedom (DOFs)." The "allowed DOFs" may depict the implicit range of motion of each associated part. Explicit ranges of motion may also be specified by a user, stored data, machine learning techniques, or a combination thereof. The explicit ranges of motion may be associated with links, joints, and/or regions (e.g., fill-in or keep-out regions). Such ranges may provide indications of net motions by the assembly. An exemplary application for such specifications of implicit and explicit ranges of motion may include an automotive multilink suspension.

Figure 6F:
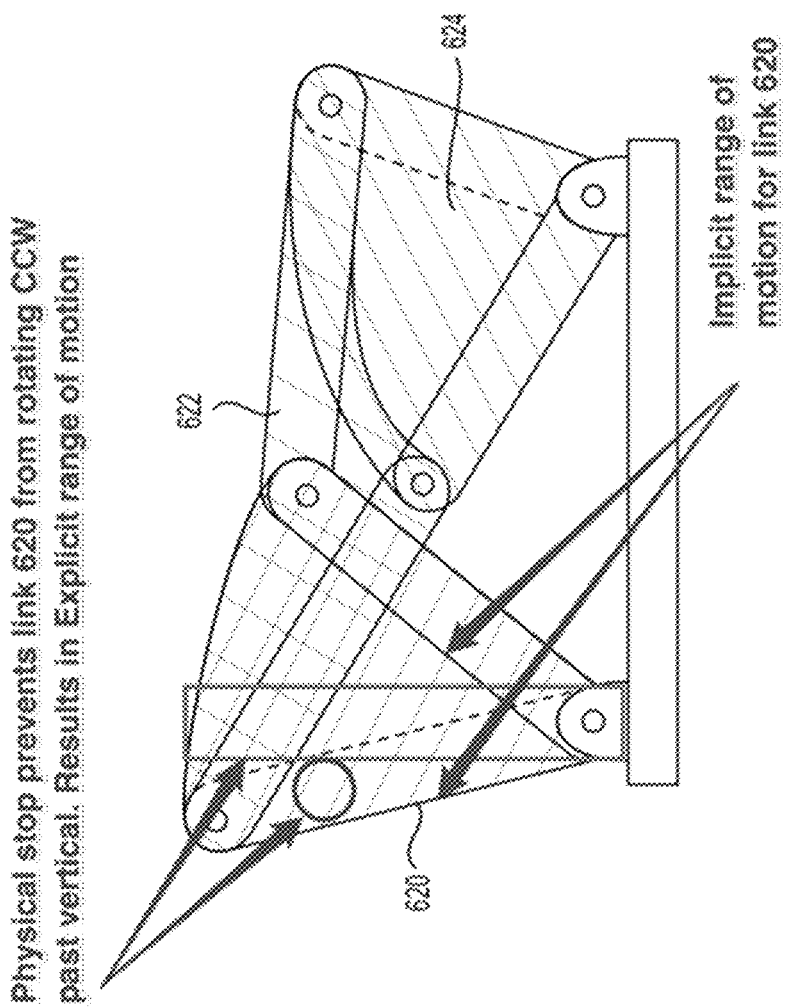

FIG. 6F depicts an illustration of implicit and explicit ranges of motion. In the context of the current invention, allowed degrees of freedom may be types of relative motion that may exist between two parts based on a defined joint between them. For example, this may be a combination of linear translation and/or rotation. When the relative motions of multiple parts (there may be more than two parts in other embodiments) are combined, the net global "allowed degrees of freedom" may be even more complex. With reference to FIG. 6F, link 620 may have 1 degree of freedom (e.g., rotation), link 624 may have 1 degree of freedom (e.g., rotation), and link 622 may be three degrees of freedom (e.g., rotation, X translation, and Y translation). In the context of the current invention, an implicit range of motion may refer to possible extent of motion that is achievable for parts and joints given the geometry of the parts and the degrees of freedom allowed by the joints, as illustrated in FIG. 6F. In the context of the current invention, explicit range of motion may refer to when the range of motion is deliberately limited and therefore is less than the implicit range of motion. An example of an explicit range of motion may be specifying a physical stop that prevents link 620 from rotating counterclockwise from its vertical position, as shown in FIG. 6F. An exemplary physical stop is represented by the vertically-extending rectangle in FIG. 6F.

FIGS. 6C-6E depict a sequence of growing the initial geometry of part 610, part 612, and part 614, where their respective motion envelopes may serve as keep-out regions that may influence resultant geometry of the other parts. First, FIG. 6C shows the initial load chain 600 with three mechanical parts (e.g., part 610, part 612, and part 614) and at least two forces (e.g., force 601 and force 603). FIG. 6C further shows the initial load chain 600 as developing a protrusion 630 on part 610. Such geometric development may occur as each of the parts are automatically generated via design platform 105.

FIG. 6D illustrates the load chain 600 articulating, and each of the parts of load chain 600 moving through their respective motion envelopes in response to force 603. As part 610 moves through its motion envelope, growing protrusion 630 may move such that its motion could cause it to intersect with part 612. To prevent interferences between protrusion 630 and part 612, the design platform 105 may automatically generatively design a geometric change to part 612. FIG. 6D illustrates an exemplary geometric change as an automatic generatively designed modification 632. In such a case, the design platform 105 may treat protrusion 630 as a keep-out region for part 612. As protrusion 630 moves towards part 612 along its motion envelope, part 612 may change shape (e.g., as modification 632) in response to the keep-out region surrounding protrusion 630. In some embodiments, part 610 with feature 630 may be illustrative of an outcome of structure generation module 209. In such embodiments, the outcome may be processed by the assembly physics module 213 through a new range of motion, thereby producing a new motion envelope for the part. This new motion envelope may be provided to structure generation module 209 (e.g., a structure generation module 209 corresponding to part 612) to thereby obtain an outcome reflecting an updated geometry in the form of shape 632. Alternately or in addition, FIG. 6D illustrates a snapshot of an exemplary next step in the growth of protrusion 630, in which an automatic generatively designed modification 632 may be made to part 612. Whether modification 632 is made in response to growth of protrusion 630 or motion of part 610/protrusion 630, modification 632 may be initiated to avoid interferences between part 610 and part 612. FIG. 6E shows a modified, resultant part 612 having the modification 632 incorporated into its geometry. As seen by a comparison of FIG. 6C and FIG. 6E, the geometric changes to part 612 may remain, even after load chain 600 returns to its initial position in its motion envelope (shown by FIG. 6C).

In summary, the present embodiments improve current tools by allowing simultaneous design of multiple parts of an assembly. This simultaneous design provides interference avoidance and automation. In addition, the disclosed techniques further design assemblies that take into account assembly-level constraints. For example, the disclosed embodiments account for, at least, load transfer, motion envelopes, motion envelope transmission, and geometric/material constraints in designing assembly parts. Assemblies produced by the disclosed embodiments thus take into account more parameters than their independently produced counterparts. It is understood that the current invention may be utilized for static assemblies of parts where it is desirable for the shapes of parts to respect the shapes of other parts such that one part does not grow and encroach upon another.

In some embodiments, linkages may be handled by use of a kinematics solver to generate motion envelopes for each part. These motion envelopes may be transmitted or passed to structure generation modules 209 as described herein. This may ensure that parts grow in such a way that a part does not interfere with other parts during a range of motion and may also ensure that each different articulation or step point results in forces that the respective parts may all handle.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that may manipulate and/or transform data represented as physical, such as electronic, quantities into other data similarly represented as physical quantities. In a similar manner, the term "processor" or "module" may refer to any device or portion of a device that processes electronic data. A "computer," a "computing machine," a "computing platform," a "computing device," or a "server" may include one or more processors.

Any of the methods or computer based functions disclosed herein may be performed on or by a computer system. An exemplary computer system may include a set of instructions that may be executed to perform the disclosed methods. Such a computer system may operate as a standalone device or may be connected, e.g., using a network, to other computer systems or peripheral devices. An exemplary computer system may operate in the capacity of a server or as a client (user) computer in a network environment, or as a peer computer system in a peer-to-peer (or distributed) network environment. The computer system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a personal trusted device, a web appliance, a network router, switch or bridge, or any other machine capable of executing a set of instructions (sequential or otherwise) that specify actions to be taken by that machine. The computer "system" shall also be taken to include any collection of systems or sub-systems that individually or jointly execute a set, or multiple sets, of instructions to perform one or more computer functions.

An exemplary computer system may include one or more processors, e.g., a central processing unit (CPU), a graphics processing unit (GPU), a general processor, digital signal processor, application specific integrated circuit, field programmable gate arrays, servers, networks, digital circuits, analog circuits, combinations thereof, or other now known or later developed devices for analyzing and processing data. The processor(s) may implement a software program.

The computer system may further include a display, which may act as an interface for the user to use the processor. The computer system may further be configured to receive user input, e.g., via a mouse, joystick, touch screen display, or other control device. The computer system may permit or provide additional connections with other components of the system 100, e.g., to one or more 3D printers. The connections may be wireless or physical.

The disclosed methods may be performed by a non-transitory computer readable medium for use on a computer system containing computer-executable programming instructions. The computer-readable medium may include a single medium or multiple media, such as a centralized or distributed database, and/or associated caches and servers that store one or more sets of instructions. The computer-readable medium may also include any medium that is capable of storing, encoding, or carrying a set of instructions for execution by a processor or that cause a computer system to perform any one or more of the methods or operations disclosed herein. The computer-readable medium may be non-transitory, and may be tangible.

The present system encompasses software, firmware, and hardware implementations. The methods described herein may be implemented by software programs executable by a computer system. Implementations may also include distributed processing, component/object distributed processing, and parallel processing. Virtual computer system processing may also be used to implement one or more of the methods or functionality as described herein.

The disclosed subject matter is to be considered illustrative, and not restrictive. The claims below are intended to cover all such modifications, enhancements, and other implementations, which fall within the true spirit and scope of the present invention. Thus, the scope of the present invention is to be determined by the broadest permissible interpretation of the following claims and their equivalents, and shall not be restricted or limited by the foregoing detailed description. While various implementations of the invention have been described, it will be apparent to those of ordinary skill in the art that many more implementations are possible within the scope of the invention. Accordingly, the invention is not to be restricted except in light of the attached claims and their equivalents.

What is claimed is:

1. A method of generatively designing a model of an assembly of mechanical parts, the method comprising:
   receiving a first set of constraints for a first part, wherein the first set of constraints includes a first fill-in region and a first keep-out region for the first part;
   determining a spatial relationship between the first part and a second part;
   updating the first set of constraints for the first part based on at least the spatial relationship between the first part and the second part; and
   generating a model of the first part based on the updated first set of constraints.

2. The method of claim 1, wherein the step of determining the spatial relationship between the first part and the second part comprises:
   determining an interface, connection, or interlocking portion between the first part and the second part.

3. The method of claim 1, wherein determining the spatial relationship between the first part and the second part comprises:
   identifying a joint joining the first part and the second part; and
   determining a joint constraint associated with the joint.

4. The method of claim 3, wherein the joint constraint comprises a first range of motion for the first part and a second range of motion for the second part, and wherein the second range of motion comprises a keep-out region for the first part.

5. The method of claim 1, further comprising:
   determining a set of load constraints associated with the spatial relationship between the first part and the second part, wherein the set of load constraints comprises one or more loads to be transferred from the first part to the second part.

6. The method of claim 5, wherein the set of load constraints is associated with a joint constraint, and the set of load constraints comprises one or more loads to be transferred from the first part to the second part via a joint associated with the joint constraint.

7. The method of claim 5, wherein the step of updating the first set of constraints for the first part based on at least the spatial relationship between the first part and the second part comprises:
 updating a fill-in region and/or a keep-out region based on the determined set of load constraints comprising the one or more loads to be transferred from the first part to the second part.

8. The method of claim 1, further comprising:
 generating a model of the second part.

9. The method of claim 8, wherein the updated first set of constraints for the first part comprises a first fill-in region and a first keep-out region for the first part, the method further comprising:
 receiving a second set of constraints for the second part, wherein the second set of constraints comprises a second fill-in region and a second keep-out region for the second part; and
 generating the model of the assembly of mechanical parts based on the updated first set of constraints and the second set of constraints.

10. The method of claim 8, further comprising:
 receiving an updated second set of constraints for the second part; and
 generating the assembly of mechanical parts further based on the updated second set of constraints for the second part.

11. The method of claim 1, wherein updating the first set of constraints for the first part based on at least the spatial relationship between the first part and the second part comprises:
 updating a fill-in region and/or a keep-out region of the first part based on the spatial relationship between the first part and the second part.

12. A non-transitory computer readable medium for use on a computer system containing computer-executable programming instructions for performing a method of generatively designing a model of an assembly of mechanical parts, the method comprising:
 receiving a first set of constraints for a first part, wherein the first set of constraints includes a first fill-in region and a first keep-out region for the first part;
 determining a spatial relationship between the first part and a second part;
 updating the first set of constraints for the first part based on at least the spatial relationship between the first part and the second part; and
 generating a model of the first part based on the updated first set of constraints.

13. The method of claim 12, wherein the step of determining the spatial relationship between the first part and the second part comprises:
 determining an interface, connection, or interlocking portion joining the first part and the second part.

14. The computer-implemented method of claim 12, wherein the step of determining the spatial relationship between the first part and the second part comprises:
 generating a model of the assembly of mechanical parts comprising the model of the first part and a model of the second part.

15. A system for performing a method of generatively designing a model of an assembly of mechanical parts, the system comprising:
 a data storage device storing instructions for performing a method of generating the model of the assembly of mechanical parts; and
 a processor configured to execute the instructions to perform a method including:
  receiving a first set of constraints for a first part, wherein the first set of constraints includes a first fill-in region and a first keep-out region for the first part;
  determining a spatial relationship between the first part and a second part;
  updating the first set of constraints for the first part based on at least the spatial relationship between the first part and the second part; and
  generating a model of the first part based on the updated first set of constraints.

16. The system of claim 15, wherein the system is further configured for:
 determining an interface, connection, or interlocking portion joining the first part and the second part.

17. The system of claim 15, wherein the system is further configured for:
 receiving a second set of constraints for a second part;
 updating the second set of constraints for the second part based on at least the spatial relationship between the first part and the second part; and
 generating a model of the second part based on the updated second set of constraints.

* * * * *